(12) United States Patent
Yonezawa et al.

(10) Patent No.: US 8,619,290 B2
(45) Date of Patent: Dec. 31, 2013

(54) IMAGE FORMING APPARATUS, IMAGE FORMING SYSTEM, AND IMAGE FORMING METHOD

(75) Inventors: Hozumi Yonezawa, Tokyo (JP); Masaaki Igarashi, Saitama (JP); Hiroshi Gotoh, Tokyo (JP); Takeshi Yoshizumi, Tokyo (JP); Osamu Inoue, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 708 days.

(21) Appl. No.: 12/805,030

(22) Filed: Jul. 8, 2010

(65) Prior Publication Data

US 2011/0013215 A1   Jan. 20, 2011

(30) Foreign Application Priority Data

Jul. 17, 2009   (JP) ................. 2009-169192
Jun. 8, 2010   (JP) ................. 2010-131410

(51) Int. Cl.
*G06F 3/12*   (2006.01)
*G06K 15/00*   (2006.01)

(52) U.S. Cl.
USPC .......... 358/1.15; 358/1.13; 358/1.14; 399/12; 399/82

(58) Field of Classification Search
USPC ...................... 358/1.15, 1.13, 1.14
See application file for complete search history.

(56) References Cited

U.S. PATENT DOCUMENTS

2003/0103777 A1*  6/2003  Nakamura et al. ............. 399/82
2004/0145771 A1*  7/2004  Stringham ................... 358/1.15
2004/0179221 A1*  9/2004  Endo et al. .................. 358/1.13
2004/0227971 A1* 11/2004  Clough et al. ............... 358/1.14
2005/0052679 A1*  3/2005  Green et al. ................. 358/1.14
2008/0239382 A1* 10/2008  Matsueda .................... 358/1.15
2009/0103933 A1*  4/2009  Miyazaki et al. ............... 399/12

FOREIGN PATENT DOCUMENTS

| JP | 2003-271347 | 9/2003 |
| JP | 2007-272832 | 10/2007 |
| JP | 2007-272833 | 10/2007 |
| JP | 2009-069948 | 4/2009 |
| JP | 2009-214321 | 9/2009 |
| JP | 2009-217467 | 9/2009 |
| JP | 2009-238206 | 10/2009 |
| JP | 2009-297994 | 12/2009 |
| JP | 2009-301135 | 12/2009 |

* cited by examiner

*Primary Examiner* — Huo Long Chen
(74) *Attorney, Agent, or Firm* — Harness, Dickey & Pierce, P.L.C.

(57) ABSTRACT

A printer includes a communicating unit that receives a print job being a unit of execution of a printing process of a first printing protocol and a second printing protocol. The first printing protocol contains a series of process instructions and print data that allow the printing process to be performed from an interrupted point when the printing process is resumed after being interrupted. The printer also includes a print processing unit that performs the printing process by executing the print job, and a priority processing unit that preferentially selects a print job of the first printing protocol related to the interrupted printing process when receiving a print job of the first printing protocol related to the interrupted printing process and a print job of the second printing protocol after the printing process of the print job of the first printing protocol is interrupted.

12 Claims, 22 Drawing Sheets

| PORT NUMBER | PRINT JOB (JOB ID) |
|---|---|
| 1100 | FIRST PRINTING PROTOCOL JOB |
| 1010 | SECOND PRINTING PROTOCOL JOB |
| | |
| | |
| | |

| PRINT ORDER | PRINT JOB (JOB ID) |
|---|---|
| 1 | FIRST PRINTING PROTOCOL JOB |
| 2 | SECOND PRINTING PROTOCOL JOB |
| 3 | |
| 4 | |
| 5 | |

RESPONSE INFORMATION
PAGE INFORMATION

```
JOB ID
NUMBER OF PRINTED PAGES
IP ADDRESS
```

FAILURE INFORMATION

```
ERROR CODE
JOB ID HAVING ERROR
IP ADDRESS
```

| ORDER | PRINT JOB |
|---|---|
| 0 | SECOND PRINTING PROTOCOL JOB |
| 0 | SECOND PRINTING PROTOCOL JOB |
| 1 | FIRST PRINTING PROTOCOL JOB |
| 1 | FIRST PRINTING PROTOCOL JOB |
| 1 | |

T1

DEDICATED RECEPTION QUEUE

1900

- PRINT-DATA NUMBER STORING UNIT — 101
- PRINT JOB TABLE — T19
- ORDER TABLE — T2
- JOB DETERMINING UNIT — 1901
- PRIORITY PROCESSING UNIT — 1902
- JOB REGISTERING UNIT — 1903
- PRINT PROCESSING UNIT — 103
- COMMUNICATING UNIT — 104
- TIMER — 105

| PORT NUMBER | PRINT JOB (JOB ID) | SERVER ID |
|---|---|---|
| 1100 | FIRST PRINTING PROTOCOL JOB | A001 |
| 1010 | SECOND PRINTING PROTOCOL JOB | B002 |
| | | |
| | | |
| | | |

FIG. 21

RESPONSE INFORMATION
PAGE INFORMATION

```
SERVER ID
JOB ID
NUMBER OF PRINTED PAGES
IP ADDRESS
```

FAILURE INFORMATION

```
SERVER ID
ERROR CODE
JOB ID HAVING ERROR
IP ADDRESS
```

IMAGE FORMING APPARATUS, IMAGE FORMING SYSTEM, AND IMAGE FORMING METHOD

CROSS-REFERENCE TO RELATED APPLICATIONS

The present application claims priority to and incorporates by reference the entire contents of Japanese Patent Application No. 2009-169192 filed in Japan on Jul. 17, 2009 and Japanese Patent Application No. 2010-131410 filed in Japan on Jun. 8, 2010.

BACKGROUND OF THE INVENTION

1. Field of the Invention

The present invention relates to an image forming apparatus, an image forming system, and an image forming method.

2. Description of the Related Art

In recent years, an Internet printing system for performing printing via an Internet network has been proposed (see, for example, Japanese Patent Application Laid-open No. 2003-271347).

Also in recent years, as illustrated in FIG. 27, an extranet has been increasingly used in which intranets 200 and 300 in a plurality of business enterprises and business offices are connected to each other via an Internet network 400. With use of the extranet as illustrated in FIG. 27, a host computer such as a server in one intranet 200 is allowed to perform a printing process on a printer in the other intranet 300.

However, in the Internet printing system as disclosed in Japanese Patent Application Laid-open No. 2003-271347 and the extranet as illustrated in FIG. 27, a printing reliability depends on the quality of the Internet. More specifically, in the extranet environment, line disconnection sometimes occurs depending on a state of a transmission line. When the line disconnection occurs, the line is to be reconnected. However, because a higher-level host transmits data in one-way communication and there is no way to allow the higher-level host to know to what extent print data has been received by a printer when the line disconnection occurs, it is difficult to perform a transmission of consecutive print data from a point of the line disconnection even when the line is reconnected. Therefore, when the line disconnection occurs, a pint job is cancelled on the presumption that the printing cannot be continued, which is inconvenient for users who perform mission-critical operations.

Furthermore, in recent years, printing environments used for various purposes such as general office printing are becoming aggregated in printers used for mission-critical operations. When printing is performed in a mixed environment in which the office operations and the mission-critical operations (e.g., an operation of issuing invoices in hospitals, banks, and the like) are mixed, it is necessary to deal with a priority order between data related to the intermittent mission-critical operations and print data related to the office operations in the mixed environment, and reconnection at a time of occurrence of power discontinuity and line disconnection.

The present invention has been made in view of the above, and it is an object of the present invention to provide an image forming apparatus, an image forming system, and an image forming method capable of maintaining the reliability and the continuity of a printing process of a first protocol in an environment in which the first protocol and a second protocol are mixed.

SUMMARY OF THE INVENTION

It is an object of the present invention to at least partially solve the problems in the conventional technology.

According to a aspect of the present invention, there is provided an image forming apparatus, the image forming apparatus including a communicating unit that receives, from a server apparatus connected to a network, an image forming job being a unit of execution of an image forming process of a first protocol or a second protocol other than the first protocol, the first protocol containing a series of process instructions and print data that allow the image forming process to be performed from an interrupted point when the image forming process is resumed after being interrupted, an image-formation processing unit that performs the image forming process by executing the image forming job, and a priority processing unit that, when an image forming process of an image forming job of the first protocol is interrupted and when receiving both an image forming job of the first protocol related to the interrupted image forming process and an image forming job of the second protocol, preferentially selects the image forming job of the first protocol related to the interrupted image forming process, wherein the image-formation processing unit successively performs the interrupted image forming process by executing the preferentially-selected image forming job of the first protocol.

According to another aspect of the present invention, there is provided an image forming system, the image forming system including a server apparatus, and an image forming apparatus connected to the server apparatus via a network, the image forming apparatus including a communicating unit that receives, from the server apparatus, an image forming job being a unit of execution of an image forming process of a first protocol or a second protocol other than the first protocol, the first protocol containing a series of process instructions and print data that allow the image forming process to be performed from an interrupted point when the image forming process is resumed after being interrupted, an image-formation processing unit that performs the image forming process by executing the image forming job, and a priority processing unit that, when an image forming process of an image forming job of the first protocol is interrupted and when receiving both an image forming job of the first protocol related to the interrupted image forming process and an image forming job of the second protocol, preferentially selects the image forming-job of the first protocol related to the interrupted image forming process, wherein the image-formation processing unit successively performs the interrupted image forming process by executing the preferentially-selected image forming job of the first protocol, and the server apparatus including a second communicating unit that transmits an image forming job of the first protocol to the image forming apparatus at times of starting up the image forming process and resuming the interrupted image forming process.

According to another aspect of the present invention, there in provided an image forming method implemented by an image forming apparatus, the image forming method including receiving, from a server apparatus connected to a network, an image forming job being a unit of execution of an image forming process of a first protocol or a second protocol other than the first protocol, the first protocol containing a series of process instructions and print data that allow the image forming process to be performed from an interrupted point when the image forming process is resumed after being interrupted, performing the image forming process by executing the image forming job, and preferentially selecting, when an image forming process of an image forming job of the first protocol is interrupted and an image forming job of the first protocol related to the interrupted image forming process and an image forming job of the second protocol are received, the image forming job of the first protocol related to the interrupted image forming process, wherein the performing includes successively performing the interrupted image forming process by executing the preferentially-selected image forming job of the first protocol.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 20 is an explanatory diagram illustrating an example of a print job table according to the second embodiment;

FIG. 21 is an explanatory diagram illustrating an example of response information according to the second embodiment;

DETAILED DESCRIPTION OF THE PREFERRED EMBODIMENTS

Exemplary embodiments of the present invention are explained in detail below with reference to the accompanying drawings.

A first embodiment of the present invention is explained below with reference to FIGS. 1 to 18. In the embodiment, an example is used in which a laser printer and an MFP (Multi Function Peripheral) are applied as a printing apparatus.

Figure 1:
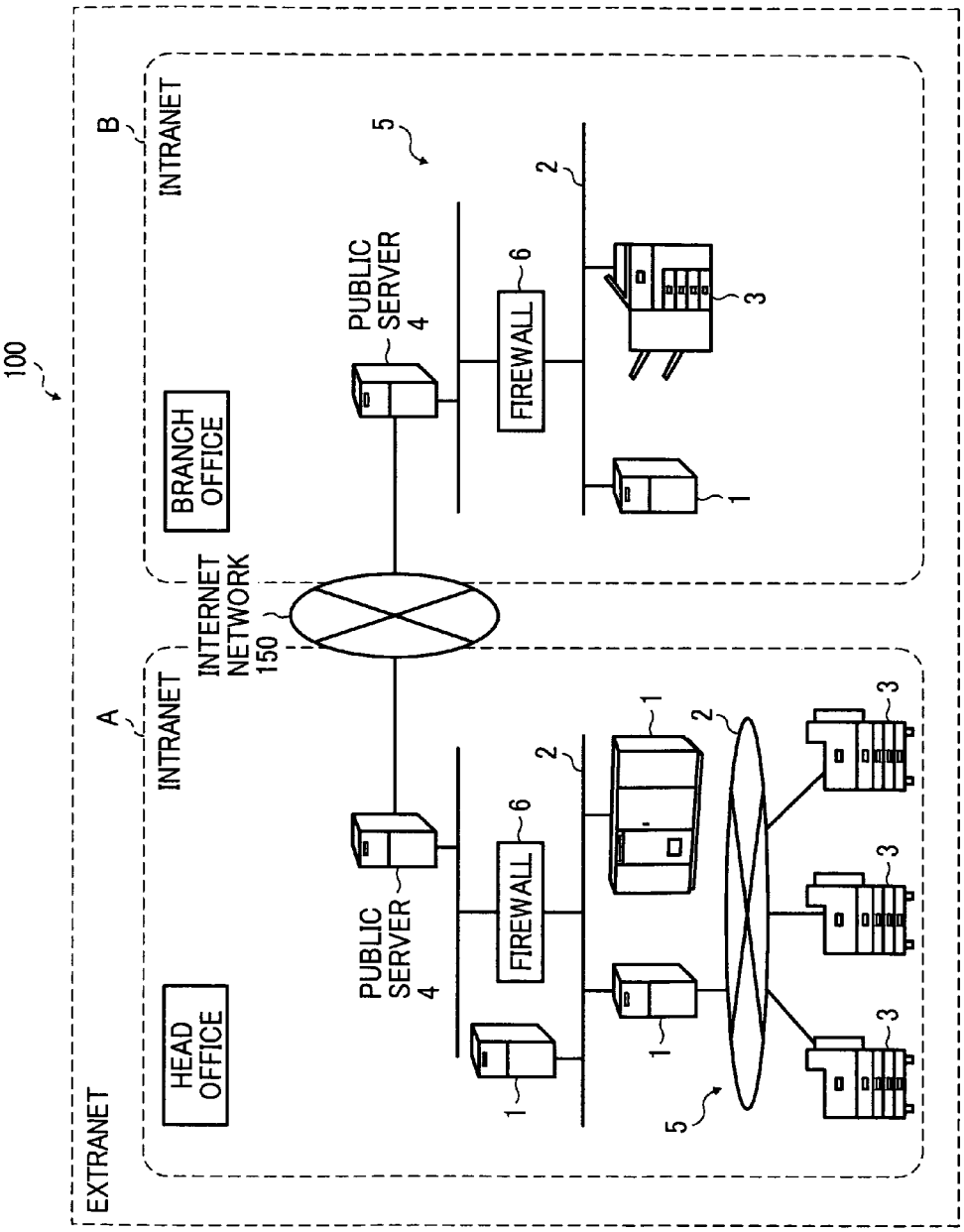
FIG. 1 is a schematic diagram illustrating a system configuration example of a network printing system according to an embodiment of the present invention.

FIG. 1 is a schematic diagram illustrating a system configuration example of a network printing system 100 according to an embodiment of the present invention. As illustrated in FIG. 1, the network printing system 100 of the embodiment is assumed to be an extranet in which intranets A and B for a plurality of business enterprises and business offices, i.e., the intranets A and B being Internet technology based in-house networks, are connected to each other via an Internet network 150.

As illustrated in FIG. 1, the intranet A in the head office of a bank for example is assumed to be a server-client system in which a plurality of clients 3, such as computers and printers, is connected to various server computers (hereinafter, referred to as "servers") 1 via networks 2 such as a LAN (Local Area Network). In the intranet A as described above, a firewall 6 is arranged at a boundary between the Internet network 150 and an in-house network 5 excluding a public server 4 such as a WWW (World Wide Web) server. The firewall 6 monitors packets exchanged between the in-house network 5 and the Internet network 150, and permits or blocks (discards) passage of the packets according to a predetermined rule, so that the security in the in-house network 5 can be ensured.

On the other hand, the intranet B in a branch office of the bank for example is also assumed to be the server-client system in which the plurality of clients 3, such as computers and printers, is connected to the various servers 1 via the network 2 such as a LAN. Also in the intranet B as described above, the firewall 6 is arranged at a boundary between the Internet network 150 and the in-house network 5 excluding the public server 4.

The network connection between the intranets A and B is not limited to the Internet network 150. For example, the intranets A and B may be connected to each other by using a dedicated communication line.

Furthermore, the network 2 is not limited by a wired communication, and a wireless communication (e.g., infrared communication and radio wave communication) may be applied. In addition, optical fibers may be used.

Figure 2:
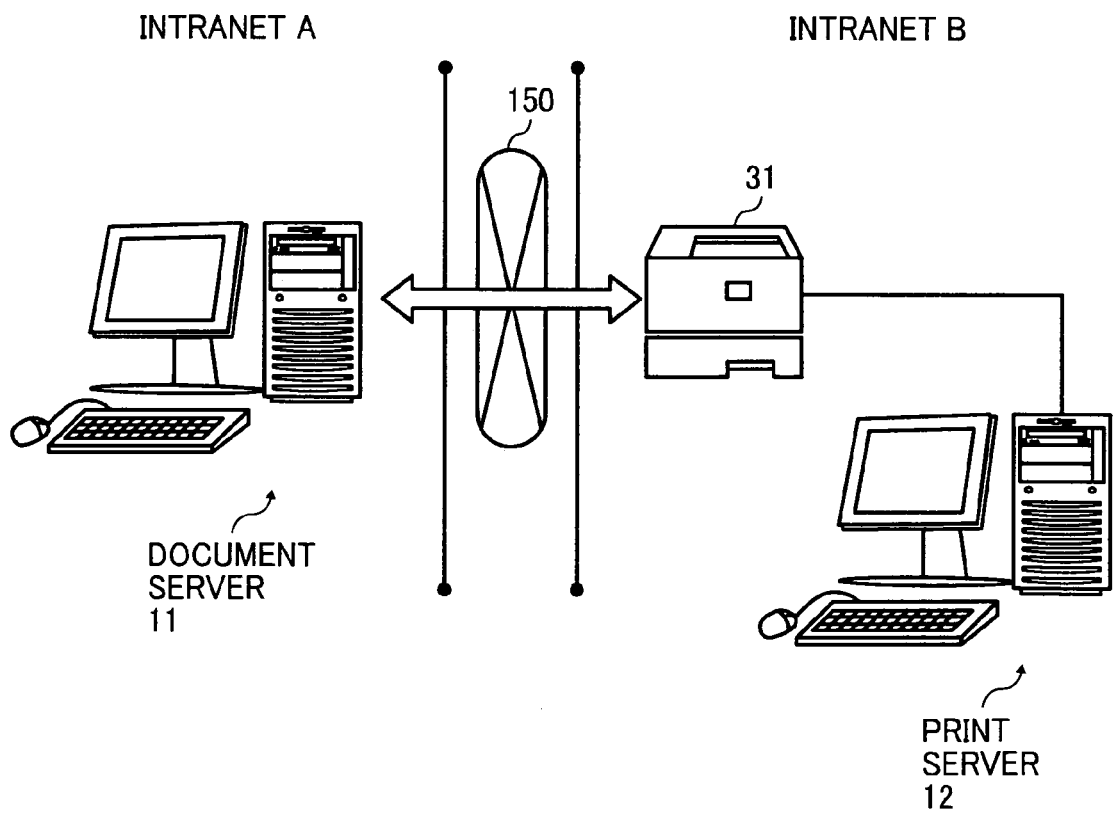
FIG. 2 is a schematic diagram illustrating a system configuration example of the network printing system.

As illustrated in FIG. 2, in the network printing system 100 as described above, a document server 11 that is one of the servers 1 included in the intranet A of the head office of the bank for example mainly handles mission-critical business processing (e.g., business processing of issuing invoices in banks and the like), and is able to directly perform a process of printing documents such as invoices on a printer 31 that is one of the clients 3 included in the intranet B of the branch office of the bank.

Figure 3:
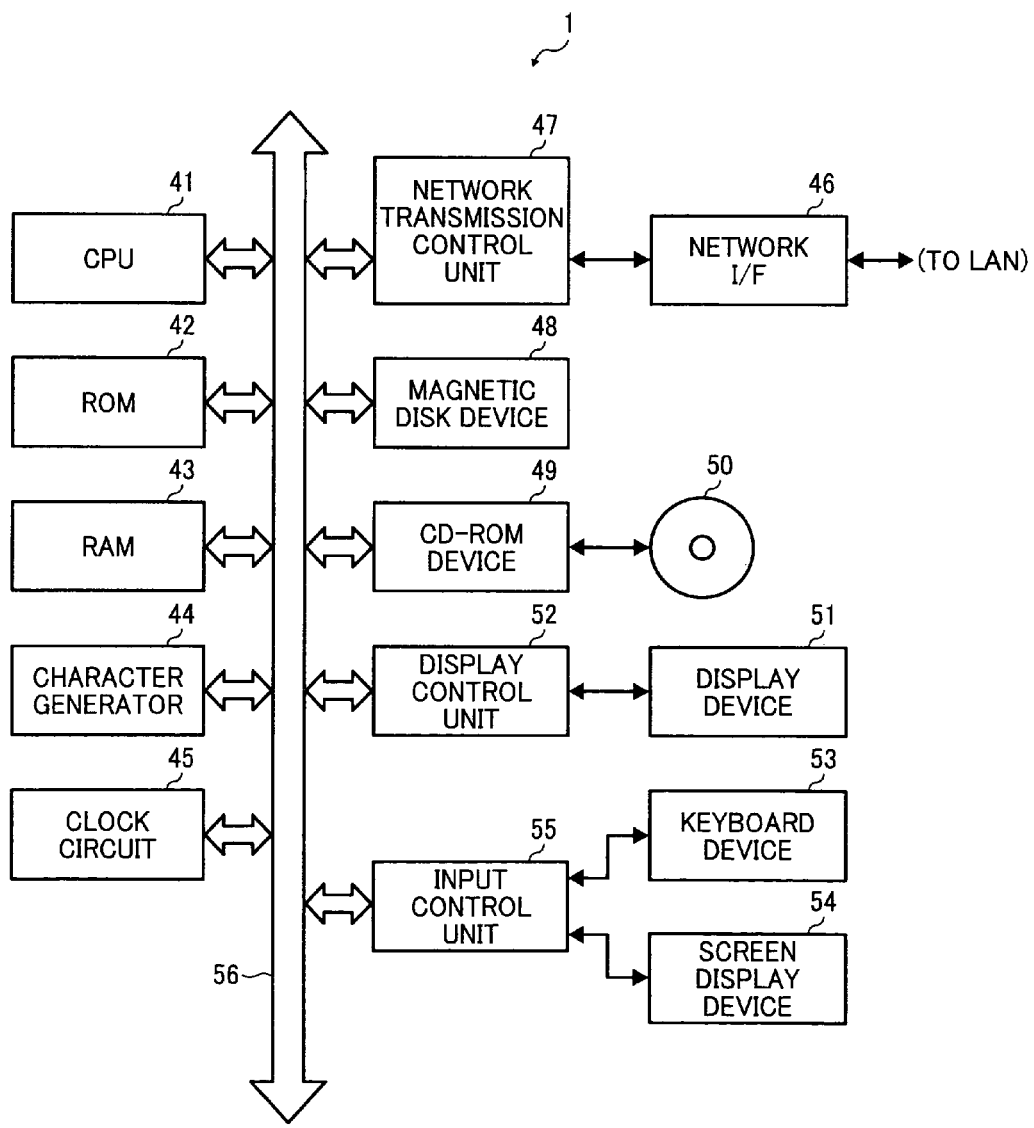
FIG. 3 is a block diagram of a configuration example of a server.

Described below is the server 1 that functions as the document server 11 included in the intranet A and a print server 12 included in the intranet B. FIG. 3 is a block diagram of a configuration example of the server 1. As illustrated in FIG. 3, the server 1 includes a CPU (Central Processing Unit) 41 that controls operations of the server 1. To the CPU 41 are connected, via an internal bus 56, ROM (Read Only Memory) 42 for storing computer programs to be executed by the CPU 41 at the time of start up and necessary data, and a RAM (Random Access Memory) 43 to be used as a work area and the like by the CPU 41.

Furthermore, a character generator 44, a clock circuit 45, a network transmission control unit 47, a magnetic disk device 48, a CD-ROM device 49, a display control unit 52, and an input control unit 55 are connected to the CPU 41 via the internal bus 56. Data exchange between the above components is mainly performed via the internal bus 56.

The character generator 44 is used for generating display data of graphic characters. The clock circuit 45 is used for outputting information on current time and date.

A network I/F circuit 46 is used for connecting the server 1 to the network 2 being a LAN. The network transmission control unit 47 is used for performing a communication control process on various predetermined protocol suites for exchanging various data with the other servers 1 and the clients 3 via the network 2. For example, the network I/F circuit 46 connects the clients 3 (printer) included in other intranets via the network 2 and the Internet network 150, and performs operation of transmitting print data and the like to the clients 3 (printer) and receiving a printing process status and the like from the clients 3 (printer).

The magnetic disk device 48 is used for storing OS (Operating System), various application programs that run on the OS, and various data such as work data, file data, and image information data. In the embodiment, a print-data transmission program and the like is stored as the application program. The CD-ROM device 49 is used for reading data (various application programs and various data such as work data, file data, and image information data) stored in a CD-ROM 50 being a replaceable recording medium. A functional difference between the document server 11 included in the intranet A of the head office of the bank and the print server 12 included in the intranet B of the branch office of the bank is due to a difference between the OS and various application programs that run on the OS, which are stored in the magnetic disk device 48.

In the server 1 as described above, when a user turns on the power to the server 1, the CPU 41 activates a computer program called a loader in the ROM 42, loads the OS from the magnetic disk device 48 onto the RAM 43, and activates the OS. The OS as described above activates the application programs, reads information, and stores information according to operations by a user. The recording medium is not limited to the CD-ROM 50, and any computer-readable recording media such as a flexible disk (FD), a CD-R, a CD-RW, a DVD, and a semiconductor memory may be used. In this case, it is of course necessary to reconfigure the CD-ROM device 49 to be able to read data in each recording medium. Furthermore, the application programs are not limited to those that run on a predetermined OS. For example, it is possible to use an application program that causes the OS to perform a part of various processes to be described later, or an application program contained as a part of a series of program files constituting predetermined application software or a predetermined OS.

In general, an application program to be installed in the magnetic disk device 48 of the server 1 is recorded in a recording medium such as the CD-ROM 50, and the application program recorded in the recording medium is installed in the magnetic disk device 48. Therefore, a portable recording medium, such as the CD-ROM 50, can be used as the recording medium for storing the application program. Furthermore, the application program may be installed in the magnetic disk device 48 by being loaded from an external apparatus via the network I/F circuit 46.

A display device 51, such as a CRT and an LCD, is used for displaying screens for operating the server 1. The display control unit 52 is used for controlling contents displayed on the display device 51.

A keyboard device 53 is used for performing various instructions to the server 1 by various key operations. A screen display device 54 is used for performing an operational work for specifying an arbitrary point on the display device 51 and the like (e.g., a pointing device such as a mouse). The input control unit 55 is used for loading information input by the keyboard device 53 and the screen display device 54.

Print document information is stored in the server 1 such that the print document information is generated by an appropriate application program upon activation of the application program by the server 1 and stored in the magnetic disk device 48; the print document information stored in the CD-ROM 50 is read by the CD-ROM device 49 and loaded onto the server 1; or the information received by an electronic mail and the like via the network 2 and the Internet network 150 is reconfigured and loaded onto the server 1.

Meanwhile, in the embodiment, it is assumed that a printing protocol installed in the OS and the various application programs that run on the OS is differentiated between the document server 11 included in the intranet A of the head office of the bank and the print server 12 included in the intranet B of the branch office of the bank. A first printing protocol being the printing protocol of the document server 11 performs data transmission and reception between the document server 11 being a higher-level host and the printer 31 (the client 3) by using a command and a response to the command. The first printing protocol is a protocol containing a series of commands (process instructions) and print data that are used in a mission-critical operation system and that allow a printing process to be performed from an interrupted point when the printing process is resumed after being interrupted. With an implementation of the first printing protocol as described above, the document server 11 is able to recognize to what extent print data has been received by the printer 31 (the client 3) when a line disconnection and the like occurs, which will be described in detail later.

On the other hand, the printing protocol (a second printing protocol) of the print server 12 is a general printing protocol installed in, for example, Windows (registered trademark).

Figure 4:
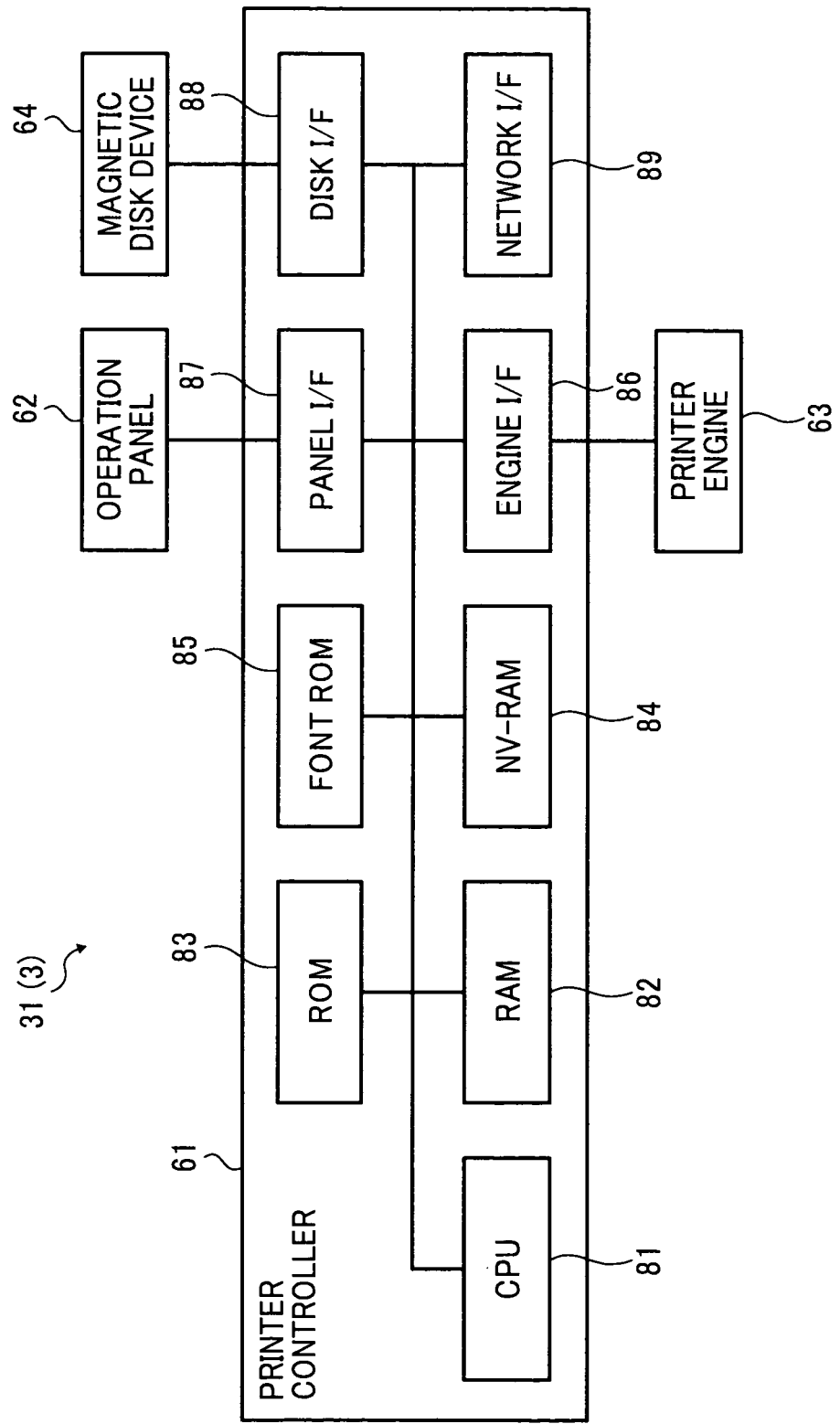
FIG. 4 is a block diagram of a configuration example of a printer.

Described below is the printer 31 (the client 3) being a printing apparatus included in the intranet B. FIG. 4 is a block diagram of a configuration example of the printer 31. As illustrated in FIG. 4, the printer 31 includes a printer controller (motherboard) 61 that performs various control processes such as a control process on each unit and an image forming process. To the printer controller 61 are connected an operation panel 62, a printer engine 63, and a magnetic disk device 64.

The printer controller 61 is a generic name of a control mechanism that converts print data received from the various servers 1 in each of the intranets A and B (e.g., the document server 11 in the intranet A) into drawing data according to a control mode set at that time and a control code received from the various servers 1 in each of the intranets A and B (e.g., the document server 11 in the intranet A), and outputs the drawing data to the printer engine 63. The printer controller 61 has a following module structure. That is, the printer controller 61 includes a CPU 81 that functions as a main component for control, a RAM 82, a ROM 83 for storing various information unique to the printer 31, a NV-RAM 84, a Font ROM 85 that is a memory for storing various types of fonts to be used for printing, an engine I/F 86, a panel I/F 87 for connecting the operation panel 62, a disk I/F 88 for connecting the magnetic disk device 64, and a network I/F 89.

The RAM 82 is used as a work area of the CPU 81, a buffer for receiving data from the various servers 1 in each of the intranets A and B, and an area for loading a processed image.

The engine I/F 86 is an I/F used for a transmission and a reception of a control signal sent from the printer controller 61 to the printer engine 63, and a status signal sent from the printer engine 63 to the printer controller 61.

The network I/F 89 is used for a transmission and a reception of a control signal and data sent from the various servers 1 in each of the intranets A and B (e.g., the document server 11 in the intranet A) to the printer 31 via the network 2, and a status signal sent from the printer 31 via the network 2.

The network I/F 89 has a first printing protocol port identified by a port number associated with the first printing protocol for the first printing protocol described above, and a second printing protocol port identified by a port number associated with the second printing protocol for a general printing protocol (i.e., the second printing protocol port) installed in Windows (registered trademark) for example.

The NV-RAM 84 is a nonvolatile memory that can maintain data regardless of power ON/OFF. By using this characteristics, in the embodiment, the NV-RAM 84 stores therein a print job table T1 and an order table T2 to be described later.

The operation panel 62 is a switch unit that is able to change a status display, a mode, and a print condition of the printer 31.

The printer engine 63 is used for forming an image by an electrophotographic process system and outputting to record the image on a recording paper. More specifically, the printer engine 63 forms an electrostatic latent image on a photosensitive element and forms an image on a transfer paper fed by a paper feed unit, based on drawing data and control information from the printer controller 61.

The magnetic disk device 64 is used for storing various types of print document information, appropriate information files other than the print document information, and the like. The magnetic disk device 64 also stores therein the OS (Operating System) and various application programs that run on the OS. In the embodiment, a printing process program is stored as the application program.

When turned on by a user, the printer 31 having the above configuration loads the OS from the magnetic disk device 64 onto the RAM 82 and activates the OS similarly to the server 1. The OS activated in this manner activates the application programs, reads information, and stores information according to operations by the user. The application programs are not limited to those that run on a predetermined OS. For example, it is possible to use an application program that causes the OS to perform a part of various processes to be described later, or an application program contained as a part of a series of program files constituting predetermined application software or a predetermined OS.

In general, an application program to be installed in the magnetic disk device 64 of the printer 31 is recorded in a recording medium such as a CD-ROM (not shown), and the application program recorded in the recording medium is installed in the magnetic disk device 64. Therefore, portable recording medium, such as a CD-ROM, can be used as the recording medium for storing the application program. Furthermore, the application program may be installed in the magnetic disk device 64 by being loaded from an external apparatus via the network I/F 89.

It is explained that the printer 31 of the embodiment includes the magnetic disk device 64; however, the present invention is not limited to this example. For example, it is possible to store the application programs and the OS in a computer-readable recording medium such as a semiconductor memory.

Figures 5, 6:
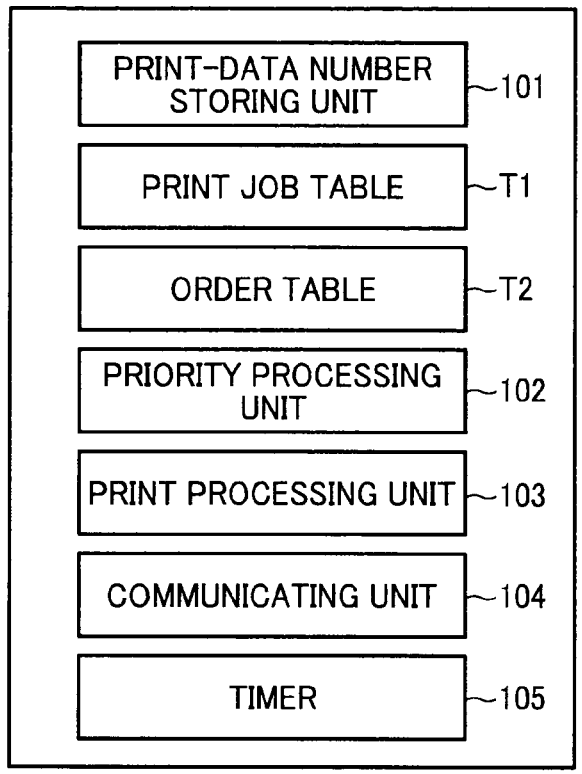
FIG. 5 is a schematic diagram illustrating a schematic functional configuration related to a printing process performed by the printer according to a first embodiment.
FIG. 6 is a schematic diagram illustrating a print job table according to the first embodiment.

Described below is a functional configuration related to a printing process performed by the printer 31 of the embodiment. FIG. 5 is a schematic diagram illustrating the functional configuration related to the printing process performed by the printer 31 according to the first embodiment. The printer 31 stores, as the application program, a printing process program in the magnetic disk device 64. That is, in the printer 31, when the printing process program that runs on the OS is activated, the CPU 81 controls each unit to perform the printing process being a part of a print process according to the printing process program.

As illustrated in FIG. 5, the printer 31 mainly includes a print-data number storing unit 101, the print job table T1, the order table T2, a priority processing unit 102, a print processing unit 103, a communicating unit 104, and a timer 105. The print-data number storing unit 101 stores, in the NV-RAM 84 being a nonvolatile recording device, the number of pieces of print data transmitted by the document server 11 as the number of pieces of received print data at a time of completion of data reception, which will be described in detail later. The NV-RAM 84 also stores therein the print job table T1 and the order table T2.

The communicating unit 104 controls a transmission and a reception of various data between the document server 11 and the print server 12. In the embodiment, the communicating unit 104 receives a print job being a unit of execution of the printing process by the first printing protocol and the second printing protocol.

Furthermore, the communicating unit 104 transmits, when an interrupted printing process related to the print job of the first printing protocol is resumed, the number of pieces of received print data to the document server 11, and receives from the document server 11 a print job of the first printing protocol containing print data continued from the point of the interruption based on the number of pieces of received print data.

In the embodiment, a different port having a different port number is assigned to each of the first printing protocol and the second printing protocol. The communicating unit 104 discriminates between the print job of the first printing protocol and the print job of the second printing protocol based on the port number of the port through which the print job has been received. Also, the communicating unit 104 generates a job ID of the received print job, and registers the job ID in the print job table T1 according to the protocol of the print job. The job ID is generated by the communicating unit 104 of the printer 31 in this example; however, the present invention is not limited to this example. The job ID may be generated by the servers 11 and 12 side that transmit the print job, and transmitted to the printer 31 by being contained in the print job.

The print job table T1 is a table containing a port number (port type) and the job ID for identifying a print job received from the document server 11 and the print server 12, in an associated manner. FIG. 6 is an explanatory diagram illustrating an example of the print job table T1. As illustrated in FIG. 6, in the example of the embodiment, a port number "1100" is assigned to the port of the first printing protocol and a port number "1010" is assigned to the port of the second printing protocol. The communicating unit 104 registers the job ID of the print job received from each port, in association with the port number corresponding to each protocol.

Figures 7, 8:
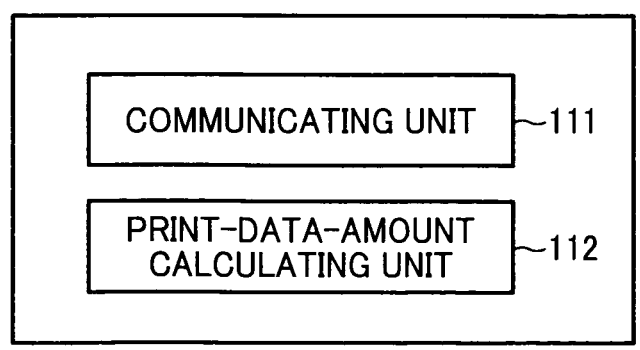
FIG. 7 is a schematic diagram illustrating an order table.
FIG. 8 is a schematic diagram illustrating a schematic functional configuration related to a printing process performed by a document server according to the first embodiment.

The order table T2 is a table in which a print order of each print job entered in the print job table T1 is set. FIG. 7 is an explanatory diagram illustrating an example of the order table T2.

The timer 105 counts time that elapses from when the printing process is allowed to be resumed after the printing process of the print job of the first printing protocol has been interrupted.

The priority processing unit 102 returns, when the transmission and reception of the print job are resumed after the transmission and reception of the print job have been interrupted, the number of pieces of received print data stored in the NV-RAM 84 in response to a request by the document server 11, and preferentially selects a process of the print job of the first printing protocol that allows to receive from the document server 11 consecutive print data from the point of the interruption, over a process of the print job of a protocol other than the first printing protocol.

More specifically, when the communicating unit 104 receives a print job of the first printing protocol related to an interrupted printing process and a print job of the second printing protocol within a predetermined time counted by the timer 105 from when the interrupted printing process is allowed to be resumed after the printing process of the print job of the first printing protocol has been interrupted, the priority processing unit 102 receives a process instruction (command) for the print job of the second printing protocol but does not receive print data of the print job of the second printing protocol. In other words, the job ID of the print job of the second printing protocol is registered in the print job table T1 by the communicating unit 104, but an instruction to transmit the print data of the print job of the second printing protocol is not output. Furthermore, the priority processing unit 102 registers, in the order table T2, an order of the job ID of the print job of the second printing protocol by setting a larger value (a value indicating a lower priority order) than that of the job ID of the print job, of the first printing protocol.

On the other hand, the priority processing unit 102 receives both a process instruction and print data of the interrupted print job of the first printing protocol. In other words, the priority processing unit 102 causes the communicating unit 104 to register the job ID of the interrupted print job of the first printing protocol in the print job table T1, outputs an instruction to transmit the print data of the print job of the first printing protocol to the document server 11 to thereby receive the print data, and causes the print processing unit 103 to continue the printing process. Furthermore, the priority processing unit 102 registers, in the order table T2, an order of the job ID of the print job of the first printing protocol by setting a smaller value (a value indicating a higher priority order) than that of the job ID of the print job of the second printing protocol. The priority processing unit 102 performs the above-mentioned process even when the print job of the second printing protocol is in a process wait state so as to preferentially select the interrupted print job of the first printing protocol.

In the embodiment, the priority processing unit 102 preferentially selects the print job of the first printing protocol by receiving both the process instruction and the print data of the print job of the first printing protocol and receiving only the print job of the second printing protocol without receiving the print data of the print job of the second printing protocol. However, the prioritization method is not limited to this example. For example, the priority processing unit 102 may be configured to preferentially select the print job of the first printing protocol by not registering the job ID of the print job of the second printing protocol in the print job table T1 when receiving the print job of the second printing protocol, or by sending to the print server 12 a notice that the print job of the second printing protocol is not to be received.

The print processing unit 103 performs the printing process on the print data contained in the print job by executing the print job of the first printing protocol and the print job of the second printing protocol, i.e., by executing commands in the print job. In the embodiment, the print processing unit 103 executes the print job of the first printing protocol that has been preferentially selected by the priority processing unit 102.

Described in detail below is the document server 11. The document server 11 stores, as the application program, a document-data transmission program in the magnetic disk device 48. In other words, in the document server 11, when the document-data transmission program that runs on the OS is activated, the CPU 41 controls each unit to perform a print-data transmission process being a part of the print process according to the document-data transmission program.

FIG. 8 is a block diagram illustrating a functional configuration of the document server 11. As illustrated in FIG. 8, the document server 11 mainly includes a communicating unit 111 and a print-data-amount calculating unit 112.

The print-data-amount calculating unit 112 receives from the printer 31 the number of pieces of received print data, which is the number of pieces of the print data that has been received by the printing process performed by the first printing protocol before interruption, and calculates the amount of print data to be successively printed based on the received number of pieces of received print data and a data size for one transmission determined by the first printing protocol.

The communicating unit 111 controls a transmission and a reception of various data to and from the printer 31. In the embodiment, the communicating unit 111 transmits a print job of the first printing protocol to the printer 31 when starting the printing process. Furthermore, when the printing process performed by the printer 31 is interrupted and if the transmission and reception of the print job are also interrupted and then resumed, the communicating unit 111 requests the printer 31 to send the number of pieces of received-print data, which is the number of pieces of print data that has been received, from the NV-RAM 84 of the printer 31. Then, the communicating unit 111 follows the first printing protocol that is waiting for a response from the printer 31, and transmits to the printer 31 a print job of the first printing protocol containing print data in an amount corresponding to a difference between the total amount of data to be printed and the amount of print data calculated by the print-data-amount calculating unit 112.

Described below is the print process being a characteristic process performed by the network printing system 100 of the embodiment among various processes performed by the CPU 41 of the document server 11 and the CPU 81 of the printer 31.

In the network printing system 100, when document data is input from the document server 11, which is one of the servers 1 included in the intranet A of the head office of the bank for example, to the printer 31, which is one of the clients 3 included in the intranet B of the branch office of the bank, the printer 31 in the intranet B side generates drawing data of the input document data based on control information of the printer controller 61, the printer controller 61 sends the generated drawing data to the printer engine 63, and a print start instruction is issued, whereby a printing is started.

Figure 9:
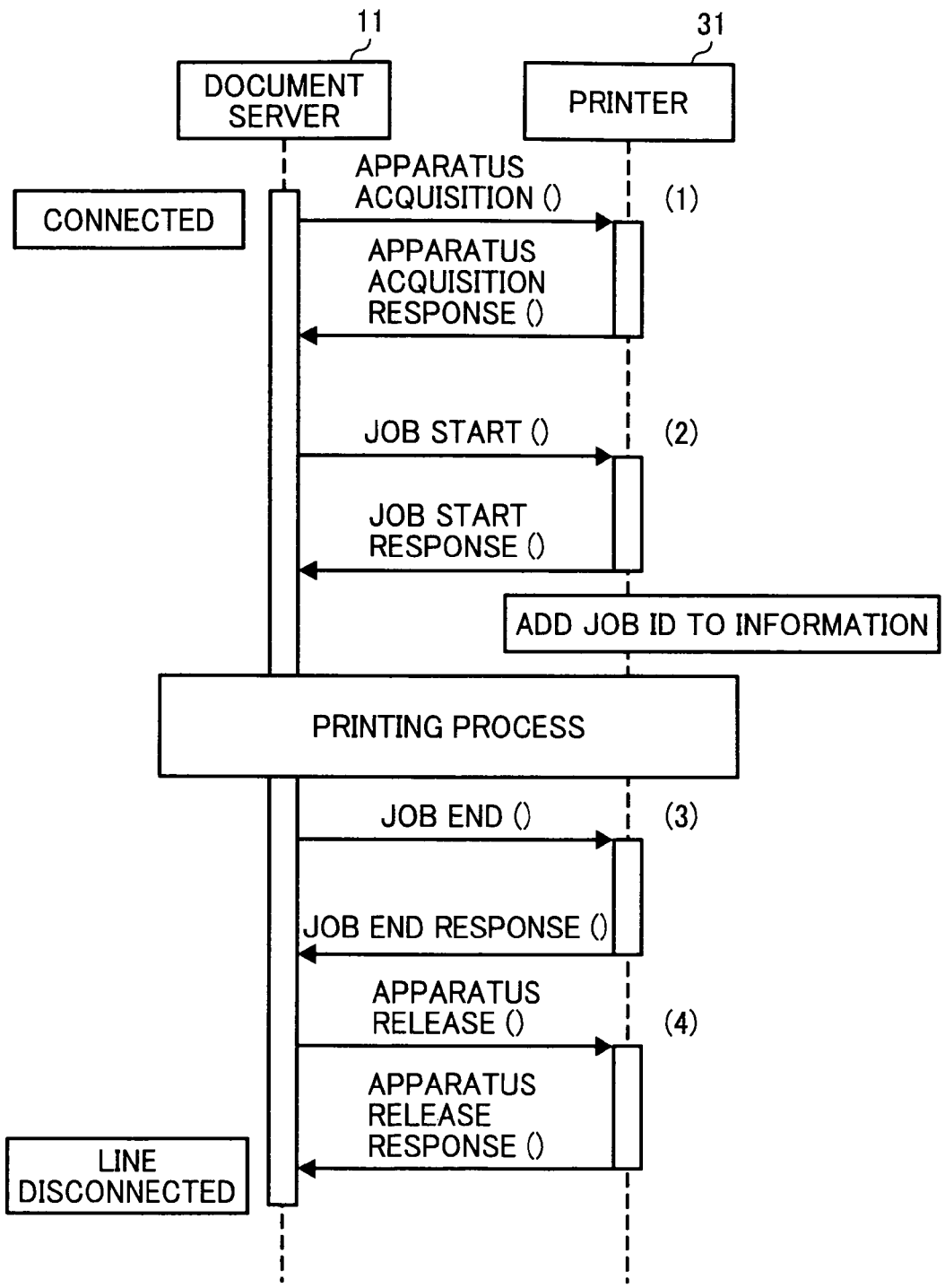
FIG. 9 is a sequence diagram illustrating a process procedure of the printing process.

A main process of the print process according to the embodiment is explained in detail for each scene with reference to FIG. 9.

In the print process, after a session is established between the document server 11 and the printer 31 connected to the network, an apparatus acquisition process is performed.

At (1), when receiving an "apparatus acquisition" command from the document server 11, the printer 31 performs a printer occupation process. Then, the printer 31 transmits an "apparatus acquisition response" command to the document server 11. The apparatus acquisition response contains an IP address of the printer. Because the printer 31 transmits information to the document server 11 via the Internet network 150 and the firewall 6, it is presumed that passage of the information is permitted by making a rule or by attaching the information to an e-mail. The same is applied to transmission of information from the printer 31 to the document server 11 described below.

The document server 11 side manages printer information of the printer 31 as a log.

At (2), when receiving a "job start" command from the document server 11, the printer 31 performs a job start process and transmits a "job start response" command to the document server 11. At this time, the printer 31 adds the acquired job ID to the print job table T1.

When the apparatus acquisition process in the network print process is completed as described above, the printing process is performed.

Figures 10, 11:
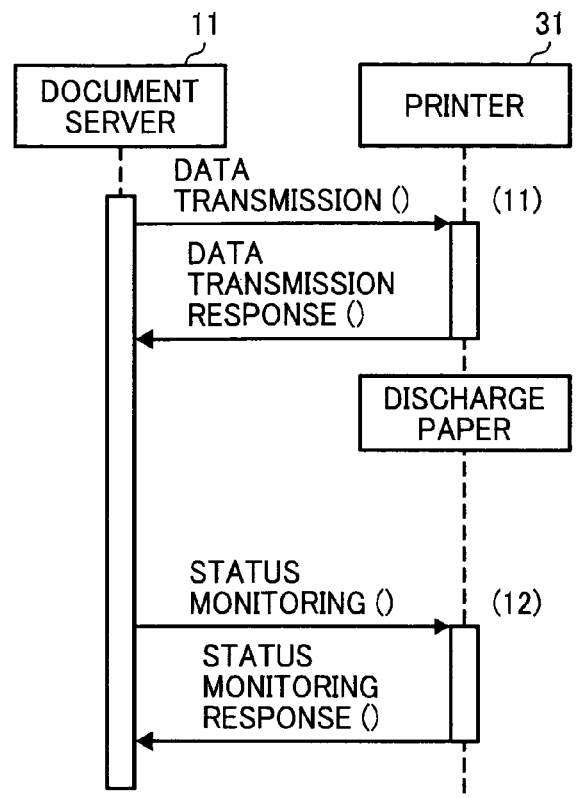
FIG. 10 is a sequence diagram illustrating a process procedure of a normal printing process.
FIG. 11 is a schematic diagram illustrating a failure information table.

A process procedure of a normal printing process is explained below with reference to a sequence diagram of FIG. 10.

At (11), when receiving a "data transmission" command from the document server 11, the printer 31 transmits a "data transmission response" command to the document server 11, and performs a print data process.

At (12), when receiving a "status monitoring" command from the document server 11, the printer 31 transmits a "status monitoring response" command to the document server 11.

The printer 31 generates, as a part of response information, page information containing the number of printed pages for each job ID.

In addition, in the embodiment, failure information is also generated as a part of the response information. A failure indicates a condition in which a print impossible state that needs to be handled by operators (lack of papers, paper jam, toner used up, or other failures) has occurred in the printer. As illustrated in FIG. 11, the printer 31 generates, as a part of the response information, the failure information containing an error code that indicates contents of an error, for each job ID having the error.

As described above, the printer 31 transmits the "status monitoring response" command to the document server 11 together with the response information. When the print impossible state that needs to be handled by operators (lack of papers, paper jam, toner used up, or other failures) has not occurred, the printing process is finished at this point.

On the other hand, the document server 11 side that has received the "status monitoring response" command from the printer 31 receives the response information being a printing result obtained by the printer 31. The status monitoring response contains a printing status, so that the document server 11 can detect the number of printed pages and completion of the printing by the printer 31. The document server 11 side manages, as a log, the response information being the printing result obtained by the printer 31.

When the printing process in the network print process is completed as described above, an apparatus release process as described below with reference to FIG. 9 is performed.

At (3), when receiving a "job end" command from the document server 11, the printer 31 performs a job end process and transmits a "job end response" command to the document server 11.

At (4), when receiving an "apparatus release" command from the document server 11, the printer 31 performs a printer release process and transmits an "apparatus release response" command to the document server 11.

Described below is a printing process performed when a line disconnection occurs.

Conventionally, a higher-level host (the document server 11) transmits data to the printer 31 in one-way communication and there is no way to allow the higher-level host (the document server 11) to know to what extent the data has been received by the printer 31 when the line disconnection occurs. Therefore, when the line is reconnected, it is difficult to resume the transmission of consecutive print data from the point of communication interruption. Consequently, when the line disconnection occurs, the print job is canceled on the presumption that the printing cannot be continued.

The network printing system 100 of the embodiment is equipped with the protocol (the first printing protocol) that exchanges data between the higher-level host (the document server 11) and the printer 31 by using a command and a response to the command. Therefore, it is possible to recognize to what extent the print data has been received by the printer 31 when the line disconnection occurs. For brief description, the printer 31 appropriately stores therein, as the number of pieces of received print data, the number of pieces of received print data transmitted by the higher-level host (the document server 11) upon completion of the reception of the print data. When the line is reconnected after the disconnection, the printer 31 returns the number of pieces of received print data in response to a request by the higher-level host (the document server 11), so that the higher-level host (the document server 11) can successively transmit the print data.

In the extranet environment as described in the embodiment, a printing reliability depends on the quality of the Internet. More specifically, in the extranet environment, line disconnection sometimes occurs depending on the state of a transmission line. When the line disconnection or the power discontinuity due to the line disconnection occurs, the higher-level host (the document server 11) performs reconnection. However, even when the server is reconnected after the power discontinuity (line disconnection), if there is a process that is busy due to the apparatus acquisition by the protocol of the document server 11 before the reconnection, other communication (e.g., a printing process by Windows) may be interposed into the apparatus re-acquisition process. Therefore, outputs may be mixed, resulting in delay in the printing process performed by the document server 11. To deal with this, the network printing system 100 of the embodiment is configured to give priority to a job of the protocol (the first printing protocol) used between the printer 31 and the document server 11 when a plurality of protocols is mixed. This is explained below with an example.

(1) Operation at the Time of Resuming from Power Discontinuity (when a Print Job of the First Printing Protocol is Interrupted)

Figure 12:
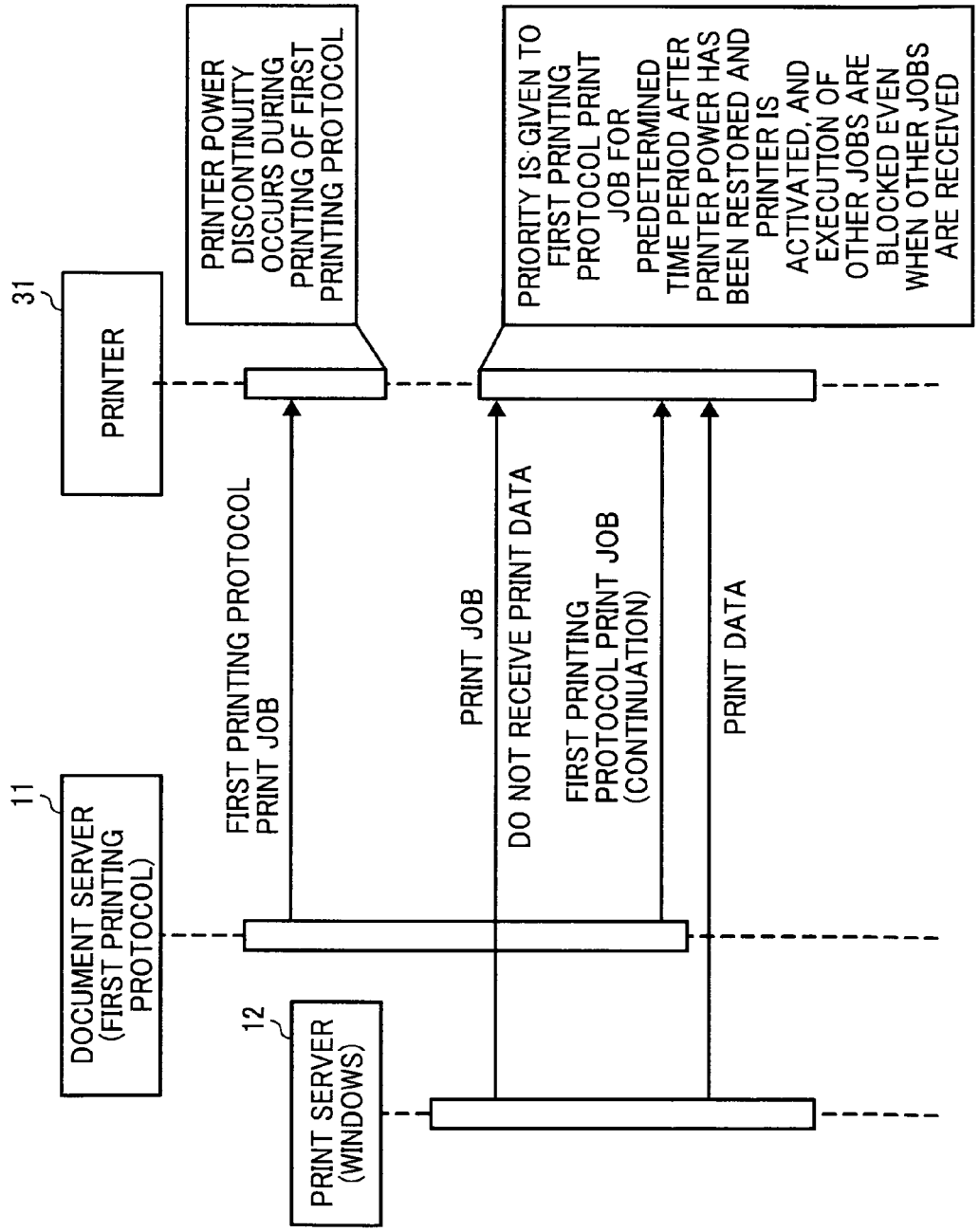
FIG. 12 is a schematic diagram illustrating a system operation performed when a power discontinuity occurs and then the power is restored according to the first embodiment.
Figure 13:
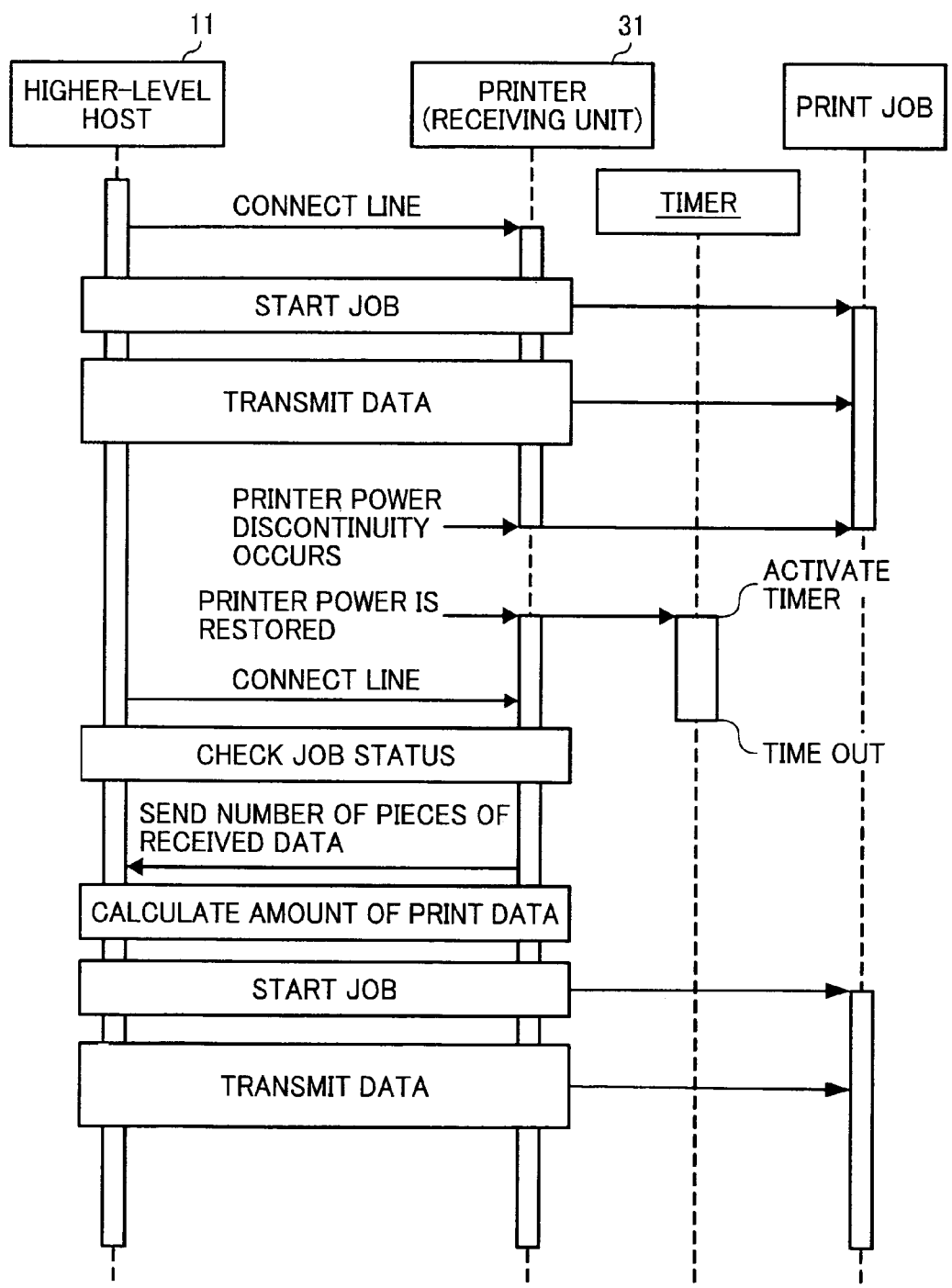
FIG. 13 is a sequence diagram illustrating a process procedure performed when the power discontinuity occurs and then the power is restored according to the first embodiment.

FIG. 12 is a schematic diagram illustrating a system operation performed when a power discontinuity occurs and then the power is restored. FIG. 13 is a sequence diagram illustrating a process procedure performed when power discontinuity occurs and then the power is restored. As illustrated in FIG. 12, when the power discontinuity occurs in the printer 31 and the print job of the first printing protocol is interrupted during the printing process instructed by the document server 11, the printer 31 gives priority to the print job of the first printing protocol and only receives other print jobs from the print server 12 (print jobs from Windows) while blocking execution of the other print jobs for a predetermined time after restart of the printer 31.

More specifically, when the power discontinuity occurs as described above, as illustrated in FIG. 13, the printer 31 activates a reconnection wait timer at a time of power restoration, and waits for a reconnection by the higher-level host (the document server 11). The reason why the reconnection waiting is limited by the timer is to give priority to the print job of the protocol (the first printing protocol) used between the printer 31 and the document server 1 when a plurality of protocols is mixed. When the print job of the first printing protocol is not being executed when the power discontinuity occurs in the printer 31, the wait for the print job of the first printing protocol is not performed when the printer 31 is restarted.

As illustrated in FIG. 13, when the line is reconnected within a reconnection wait time, the higher-level host (the document server 11) sends to the printer 31 a query for checking a job status at the time of the power discontinuity. The printer 31 returns the number of pieces of received print data as information necessary for continuing the job. The higher-level host (the document server 11) calculates an amount of print data that has been received by the printer 31 based on the number of pieces of received print data and the data size for one transmission determined by the protocol, and resumes the transmission of consecutive data, so that the printing can be continued. The print job in the printer 31 is not cancelled when the power discontinuity occurs, and is maintained in a data reception wait state. Therefore, it is possible to continue the process on the print data transmitted by the higher-level host (the document server 11).

When a print job of a protocol other than the first printing protocol (e.g., a print job from Windows) is received within the reconnection wait time while the print job of the first printing protocol is being interrupted, only a print job (process instruction) is received in the print job table T1 and a print job (print data) is not received. In other words, the printer 31 is in such a state that it does not issue a data transmission instruction to the print server 12. After the print job of the first printing protocol is completed, the print server 12 transmits the print job (print data) according to an instruction by the printer 31. The completion of the print job of the first printing protocol is detectable by a job end mark added to the job.

(2) Operation at the Time of Resuming from Line Disconnection (when a Print Job of the First Printing Protocol is Interrupted)

Figure 14:
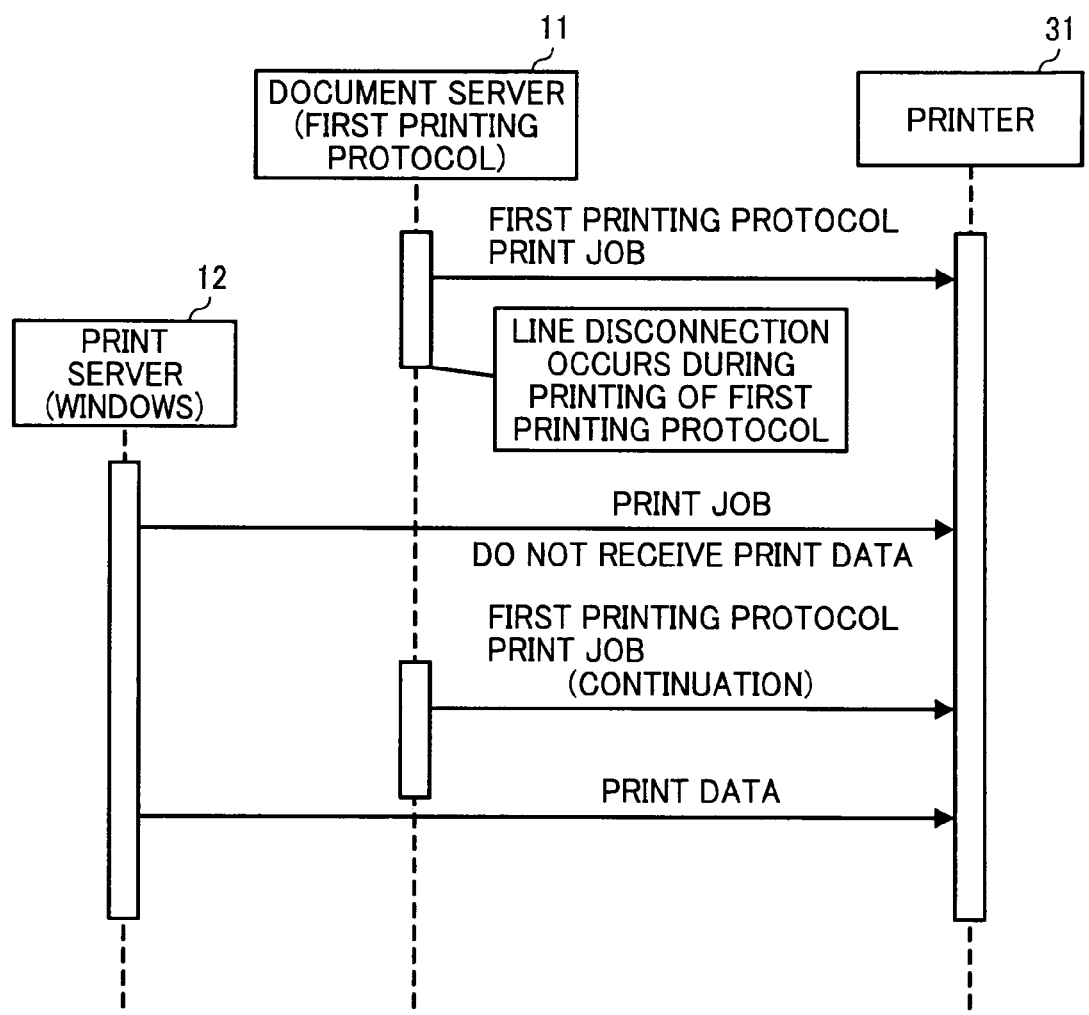
FIG. 14 is a schematic diagram illustrating a system operation performed when a line disconnection occurs and then the line is reconnected according to the first embodiment.
Figure 15:
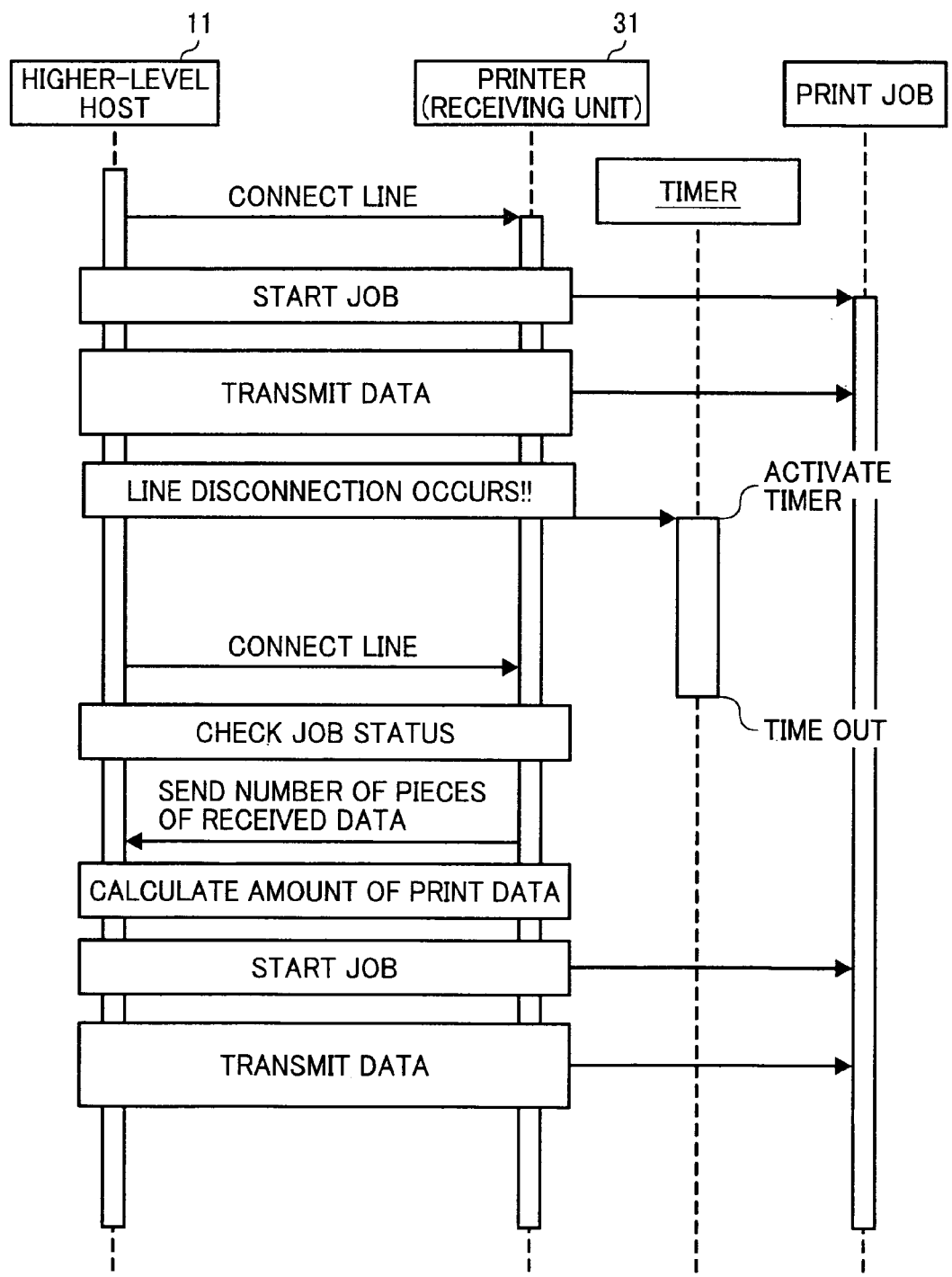
FIG. 15 is a sequence diagram illustrating a process procedure performed when a reconnection is timed out according to the first embodiment.

FIG. 14 is a schematic diagram illustrating a system operation performed when the line disconnection occurs and then the line is reconnected. FIG. 15 is a sequence diagram illustrating a process procedure performed when a reconnection is timed out. As illustrated in FIG. 14, when the line disconnection occurs in the document server 11 and the print job of the first printing protocol is interrupted during the printing process instructed by the document server 11 to the printer 31, the printer 31 gives priority to the print job of the first printing protocol and only receives other jobs (print jobs from Windows) while blocking execution of the other jobs for a predetermined time after the line to the document server 11 has been disconnected.

More specifically, when the line disconnection occurs as described above, as illustrated in FIG. 15, the printer 31 activates the reconnection wait timer and waits for a reconnection by the higher-level host (the document server 11). The reason why the reconnection waiting is limited by the timer is to give priority to the print job of the communication protocol (the first printing protocol) used between the printer 31 and the document server 11 when a plurality of protocols is mixed.

As illustrated in FIG. 15, when the line is reconnected within a reconnection wait time, the higher-level host (the document server 11) sends to the printer 31 a query for checking a job status at the time of the line disconnection. The printer 31 returns the number of pieces of received print data as information necessary for continuing the job. The higher-level host (the document server 11) calculates the amount of print data that has been received by the printer 31 based on the number of pieces of received print data and the data size for one transmission determined by the protocol, and resumes the transmission of consecutive data, so that the printing can be continued. The print job in the printer 31 is not cancelled when the line disconnection occurs, and is maintained in a data reception wait state. Therefore, it is possible to continue the process on the print data transmitted by the higher-level host (the document server 11).

When a print job of a protocol other than the first printing protocol (e.g., a print job from Windows) is received within the reconnection wait time while the print job of the first printing protocol is being interrupted, only a print job (process instruction) is received in the print job table T1 and a print job (print data) is not received. In other words, the printer 31 is in such a state that it does not issue a data transmission instruction to the print server 12. After the print job of the first printing protocol is completed, the print server 12 transmits the print job (print data) according to an instruction by the printer 31. The completion of the print job of the first printing protocol is detectable by a job end mark added to the job.

(3) Operation at the Time of Normal Printing (Priority is Given to a Print Job of the First Printing Protocol)

Figure 16:
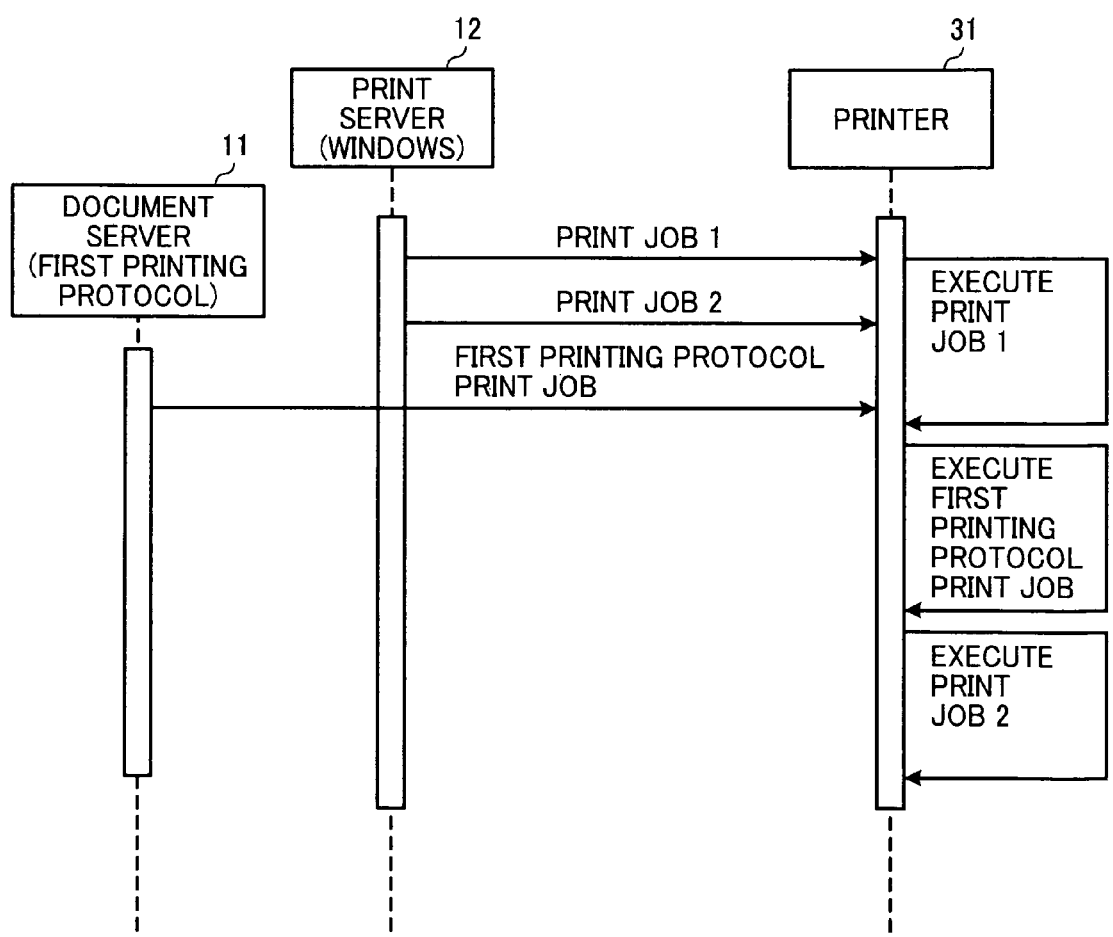
FIG. 16 is a sequence diagram illustrating a process procedure of a normal printing process according to the first embodiment.

As illustrated in FIG. 16, in normal printing, the printer 31 gives priority to a print job of the first printing protocol over other print jobs (print jobs from Windows) when performing a process. However, the printer 31 does not interrupt a job, and, when other job (a print job from Windows) is present after the job being executed is finished, the printer 31 preferentially performs a print job of the first printing protocol over the other job. FIG. 16 illustrates an example in which a print job 1 (a print job from Windows) and a print job 2 (a print job from Windows) have been received, and a print job of the first printing protocol is received while the print job 1 is being executed. In this case, after the print job 1 is finished, the print job of the first printing protocol is preferentially executed and thereafter the print job 2 is subsequently executed.

Figure 17:
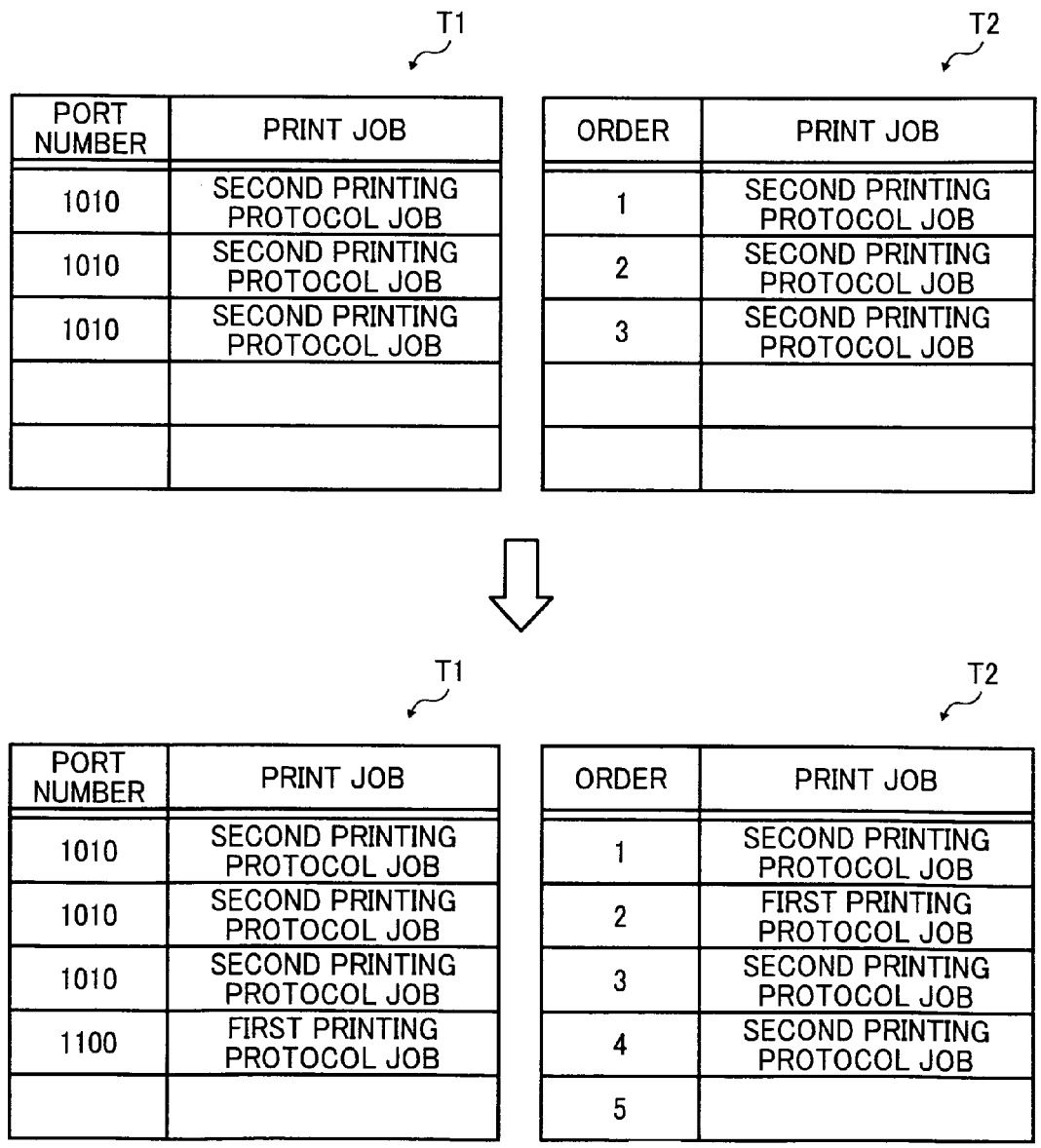
FIG. 17 is a schematic diagram illustrating examples of contents of tables used for a priority process.

In other words, when a print job of the first printing protocol from the first printing protocol port is transmitted while print jobs of the second printing protocol (print jobs from Windows) other than the print job of the first printing protocol are being sequentially transmitted, the print job of the first printing protocol is interposed as illustrated in FIG. 17 so as to be processed next to the print job of the second printing protocol (the print job from Windows) being printed.

Figures 18, 19:
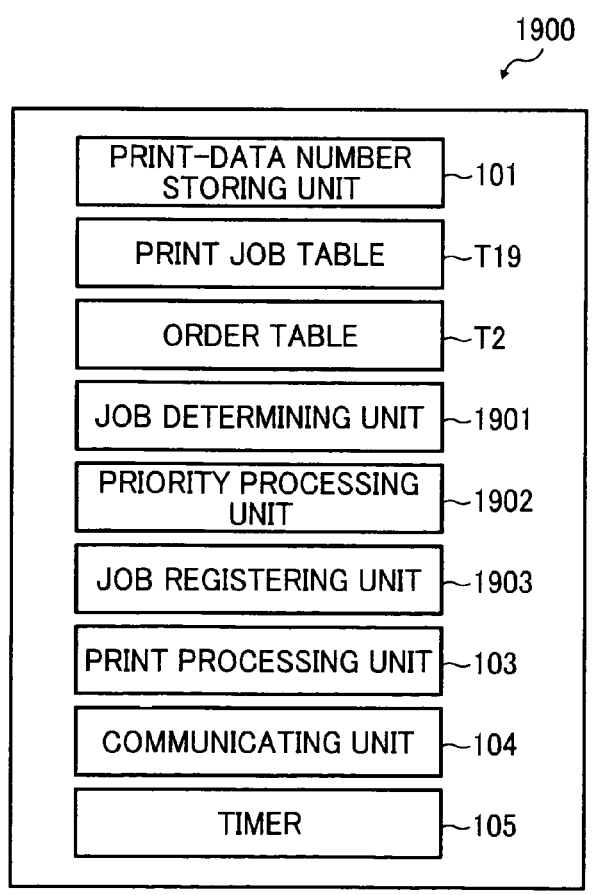
FIG. 18 is a schematic diagram illustrating a print job table.
FIG. 19 is a block diagram illustrating a functional configuration of a printer according to a second embodiment.

In some cases, the print job table T1 may be filled with sequentially-transmitted print jobs of the second printing protocol (print jobs from Windows), and a print job of the first printing protocol may not preferentially be performed as described above. Therefore, as illustrated in FIG. 18, it is possible to arrange a dedicated reception queue for receiving only a print job of the first printing protocol in the print job table T1. Consequently, even when print jobs of the second printing protocol (print jobs from Windows) are sequentially transmitted, it is possible to receive a print job of the first printing protocol, so that it is possible to prevent the print job of the first printing protocol from not being preferentially performed due to full entries in the print job table T1.

In this manner, according to the embodiment, when the transmission and reception of a print job of the first printing protocol used between the host apparatus and the printing apparatus are interrupted and then reconnected, the printing apparatus returns the number of pieces of received print data stored in the nonvolatile storage device in response to a request by the host apparatus, so that the host apparatus can successively transmit the print data. Furthermore, a process on the print job of the first printing protocol is preferentially performed over the process on a print job of a protocol other than the first printing protocol. Therefore, in an environment in which a protocol used in a printing environment for a mission-critical operation system (the first printing protocol) and a protocol used in a printing environment for a general office operation system (a protocol other than the first printing protocol) are mixed, it is possible to continue a process on the print job of the first printing protocol and preferentially perform connection for the print job of the first printing protocol of the mission-critical operation system when a power discontinuity or a line disconnection occurs in the printing environment for the mission-critical operation system. As a result, it is possible to preferentially output a set of pieces of print data of the first printing protocol. Thus, according to the embodiment, when the printing by the first printing protocol for the mission-critical operation system is interrupted and then the interruption is resumed, it is possible to continue the printing by the first printing protocol without interposing a printing process of other protocols. Therefore, a reliability and a continuity of the printing process of the mission-critical operation system can be ensured.

In the network printing system according to the first embodiment, when a printing process of a print job of the first printing protocol is interrupted and then allowed to be resumed in the printer 31, and even if a print job of the second printing protocol is received, priority is given to the interrupted print job of the first print protocol to thereby continue the printing process. In a network printing system according to a second embodiment of the present invention, in addition to those described above in the first embodiment, when the interruption is allowed to be resumed and a print job of the first printing protocol is received, it is determined whether the print job is transmitted by a document server that has transmitted the print job related to the interrupted printing process, so that masquerading for continuation of the print job can be prevented.

FIG. 19 is a block diagram illustrating a functional configuration of a printer 1900 according to the second embodiment. The hardware configuration of the printer 1900 of the second embodiment, the hardware configuration and the functional configuration of the document server 11, and the configuration of the print server 12 are identical to those of the first embodiment.

The printer 1900 of the second embodiment mainly includes, as illustrated in FIG. 19, the print-data number storing unit 101, a print job table T19, the order table T2, a priority processing unit 1902, a job registering unit 1903, a job determining unit 1901, the print processing unit 103, the communicating unit 104, and the timer 105. The functions and the configurations of the print-data number storing unit 101, the order table T2, the print processing unit 103, the communicating unit 104, and the timer 105 are identical to those of the printer 31 of the first embodiment.

The print job table T19 is a table containing a port number, a job ID of a print job received from the document server 11 and the print server 12, and a server ID for identifying each of the document server 11 and the print server 12, in an associated manner. FIG. 20 is an explanatory diagram illustrating an example of the print job table T19 according to the second embodiment. As illustrated in FIG. 20, in the example of the embodiment, similarly to the first embodiment, the port number "1100" is assigned to a port of the first printing protocol and the port number "1010" is assigned to a port of the second printing protocol, and the server ID of a server that has transmitted the received print job is registered.

FIG. 21 is an explanatory diagram illustrating an example of the response information. As illustrated in FIG. 21, the server ID is registered in the response information in addition to the contents explained in the first embodiment.

Referring back to FIG. 19, when the communicating unit 104 receives print jobs of the first printing protocol and the second printing protocol, the job registering unit 1903 registers the server IDs of the servers 11 and 12 that have transmitted the print jobs, the job IDs of the received print jobs, and port numbers of the ports that have received the respective print jobs in the print job table T19 in an associated manner. The server IDs may be contained in the print jobs by the servers 11 and 12, may be generated by the job registering unit 1903 based on IP addresses of the servers 11 and 12, or may be set to be identical to the IP addresses.

After the printing process of the print job of the first printing protocol is interrupted, when receiving a print job of the first printing protocol in which the job ID for the interrupted print job is specified for continuing the interrupted print job, the job determining unit 1901 determines whether the server ID of the document server 11 that has transmitted the received print job matches the server ID corresponding to the job ID specified in the print job table T19. Consequently, the job determining unit 1901 determines whether a plurality of received print jobs are print jobs of the first printing protocol related to the interrupted printing process.

The priority processing unit 1902 preferentially selects a print job of the first printing protocol over the print job of the second printing protocol similarly to the first embodiment. When the server ID of the document server 11 that has transmitted the received print job matches the server ID corresponding to the job ID specified by the print job, the priority processing unit 102 preferentially selects the received print job as the print job of the first printing protocol related to the interrupted printing process. Furthermore, when the server ID of the document server 11 that has transmitted the received print job does not match the server ID corresponding to the job ID specified by the print job, the priority processing unit 102 does not preferentially select the received print job.

Figure 22:
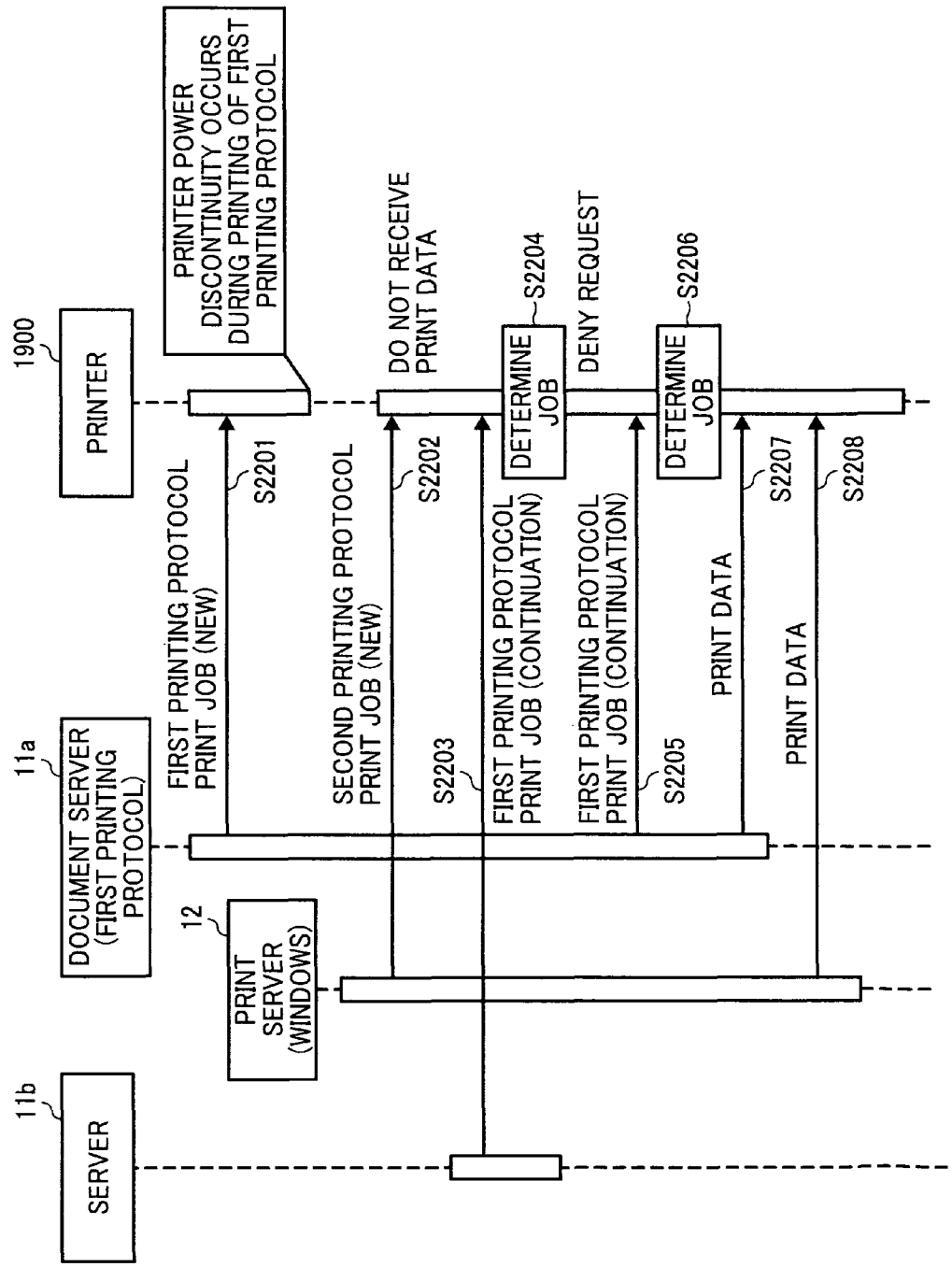
FIG. 22 is a sequence diagram illustrating a flow of a printing process performed by a network printing system according to the second embodiment.
Figure 23:
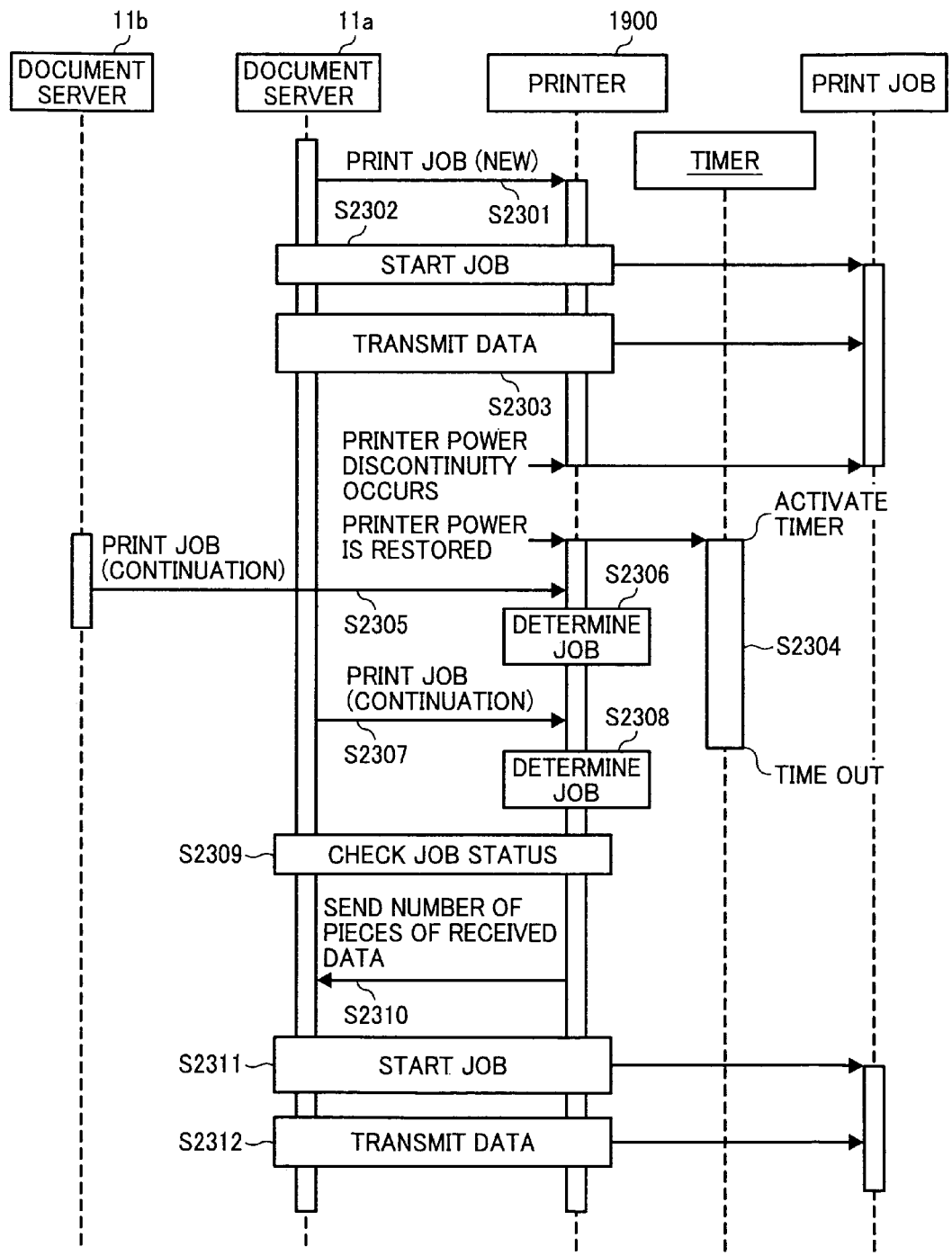
FIG. 23 is a sequence diagram illustrating a detailed flow of the printing process performed by the network printing system according to the second embodiment.

Described below is a printing process performed by the network printing system configured as described above according to the embodiment. FIG. 22 is a sequence diagram illustrating a flow of a printing process performed by the network printing system according to the second embodiment. FIG. 23 is a sequence diagram illustrating a detailed flow of the printing process performed by the network printing system according to the second embodiment. FIGS. 22 and 23 illustrate an example in which the printing process is interrupted due to a power discontinuity of the printer 1900 and the printing process is resumed by restoring the power of the printer 1900.

A print job of the first printing protocol is transmitted from a document server 11a to the printer 1900 (Steps S2201 and S2301). In this case, the job registering unit 1903 of the printer 1900 registers the job ID of the print job of the first printing protocol, the server ID, and the port number in the print job table T19 in an associated manner.

Then, the print processing unit 103 of the printer 1900 starts execution of the print job (Step S2302), and receives print data from the document server 11a (Step S23 03), so that the printing process is performed.

It is assumed here that the printing process is interrupted due to a power discontinuity of the printer 1900 during the printing process. Then, when the power of the printer 1900 is restored, the printer 1900 activates the timer 105 (Step S2304). When a print job of the second printing protocol is transmitted by the print server 12 before time out (Step S2202), the priority processing unit 1902 of the printer 1900 receives only a process instruction of the print job of the second printing protocol and does not receive corresponding print data, similarly to the first embodiment.

It is also assumed here that, before the time out, a print job indicating job continuation of the first print protocol is transmitted to the printer 1900 by a server lib different from the document server 11a that has transmitted the print job being interrupted (Steps S2203 and S2305). In the transmission of this print job, it is assumed that a request for continuation of the print job, i.e., a job ID of the interrupted print job, is specified to resume the interrupted printing process. In this case, the job determining unit 1901 of the printer 1900 determines the job (Steps S2204 and S2306).

More specifically, the job determining unit 1901 compares the server ID of the server 11b that has transmitted the print job with the server ID that is stored in the print job table T19 and corresponding to the job ID specified by the print job to thereby determine whether the server 11b that has transmitted the print job matches the document server 11a that has transmitted the print job being interrupted. In this example, because the server IDs do not match each other, it is determined that the print job from the server 11b is masquerading as that from the document server 11a, and the continuation request for the print job is denied.

Thereafter, it is assumed that a print job of the first printing protocol is transmitted from the document server 11a to the printer 1900 (Steps S2205 and S2307). In the transmission of this print job, the job ID of the interrupted print job is specified. In this case, the job determining unit 1901 of the printer 1900 determines the job in the same manner as that at Step S2204 (Steps S2206 and S2308).

In this example, because the server IDs match each other, the print job from the document server 11a is accepted. In this case, the printer 1900 checks a job status with the document server 11a (Step S2309), transmits the number of pieces of received print data to the document server 11a (Step S2310) to request the consecutive print data, and receives the print data in response to this request (Step S2207). Then, the print processing unit 103 of the printer 1900 starts execution of the interrupted print job of the first printing protocol (Step S2311). Then, the printer 1900 receives the print data from the document server 11a, so that the printing process is performed (Step S2312).

After the printing process as described above is completed, the print data of the print job of the second printing protocol received at Step S2202 is received from the print server 12 (Step S2208). Accordingly, the printing process of the print job of the second printing protocol is started.

In the embodiment, an example is explained in which the printing process is interrupted due to the power discontinuity of the printer 1900 and is resumed by restoration of the power of the printer 1900. However, when the printing process is interrupted due to the line disconnection and is resumed by the line reconnection, the job determination is performed in the same manner.

As described above, in the network printing system according to the embodiment, when the printing process of the print job of the first printing protocol is interrupted and then allowed to be resumed in the printer 1900 and if the print job of the first printing protocol is received, it is determined whether the print job is transmitted by the document server that has transmitted the print job related to the interrupted printing process. Therefore, it is possible to prevent masquerading for continuation of the print job of the first printing protocol, so that the security can be enhanced.

In the network printing system according to the second embodiment, when the printing process by the printer 1900 is interrupted and then allowed to be resumed, the masquerading for continuation of the print job is prevented. However, in a third embodiment of the present invention, when the printing process is allowed to be resumed and a print job is received from a document server other than a document server that has transmitted the print job being interrupted, priority is given to the continuation of the print job received from the document server that has transmitted the print job being interrupted.

Figure 24:
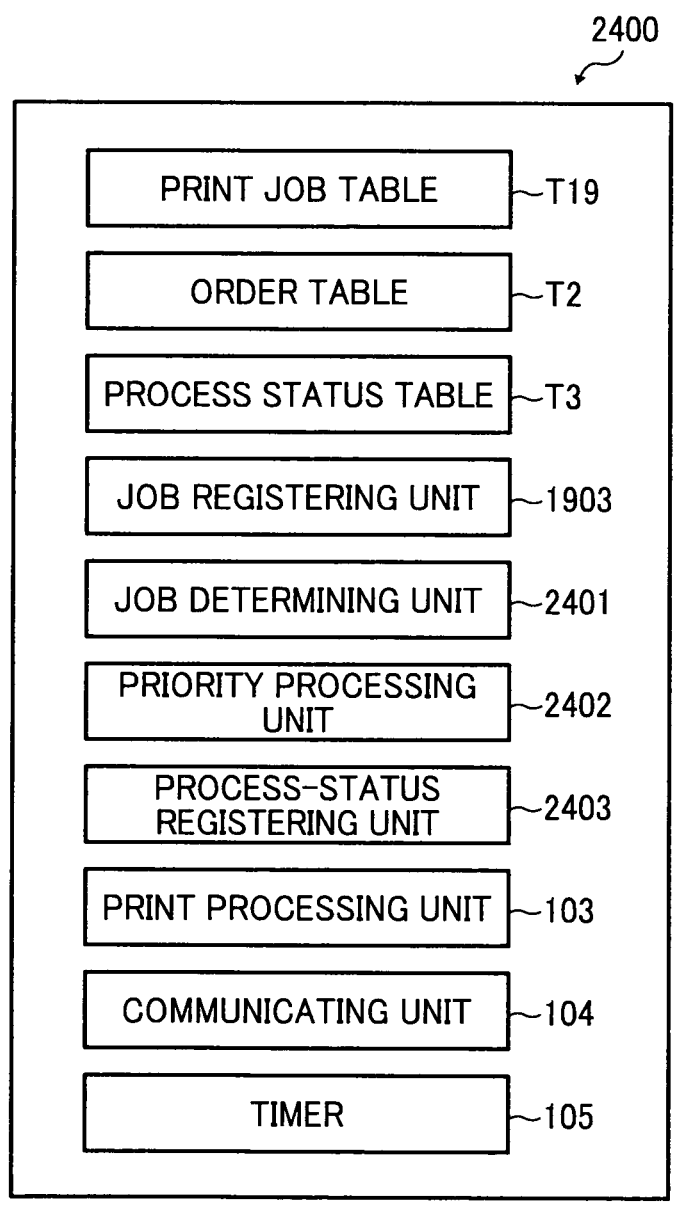
FIG. 24 is a block diagram illustrating a functional configuration of a printer according to a third embodiment.

FIG. 24 is a block diagram illustrating a functional configuration of a printer 2400 according to the third embodiment. The hardware configuration of the printer 2400 of the third embodiment, the hardware configuration and the functional configuration of the document server 11, and the configuration of the print server 12 are identical to those of the first embodiment.

The printer 2400 of the third embodiment mainly includes, as illustrated in FIG. 24, the print job table T19, the order table T2, a process status table T3, a priority processing unit 2402, the job registering unit 1903, a process-status registering unit 2403, a job determining unit 2401, the print processing unit 103, the communicating unit 104, and the timer 105. The functions and the configurations of the print job table T19, the order table T2, the job registering unit 1903, the print processing unit 103, the communicating unit 104, and the timer 105 are identical to those of the printer 1900 of the second embodiment.

The process status table T3 is a table containing a job ID of a print job, a process status of a printing process, and the number of pieces of received print data being print data received from the document server 11, in an associated manner. As the process status, the number of printed pages for example is registered.

The process-status registering unit 2403 registers, when receiving a print job of the first printing protocol from the document server 11, the number of pieces of received print data being the print data received from the document server 11 in the process status table T3 in association with the job ID of the print job. Furthermore, the process-status registering unit 2403 sequentially registers printing process statuses in the process status table T3 in the course of the printing process. For example, the process-status registering unit 2403 registers, as the process status, the number of printed pages in the process status table in association with the job ID every time one page is printed.

The process status is not limited to the number of printed pages, and may be the number of pieces of received print data.

Furthermore, in the embodiment, it is assumed that the job ID of the print job is generated by the document server 11 side and added to the print job to be transmitted.

When the printing process of the print job of the first printing protocol executed by the print processing unit 103 is interrupted and when receiving an image forming job of the first printing protocol in which a job ID is specified for continuing the printing, the job determining unit 2401 determines whether a process status corresponding to the specified job ID is registered in the process status table T3 or not to thereby determine whether a plurality of received print jobs are the interrupted print jobs of the first printing protocol.

When the process status corresponding to the specified job ID is registered in the process status table T3, the priority processing unit 2402 determines that the received print job is the print job of the interrupted first printing protocol, and preferentially selects the received print job. On the other hand, when the process status corresponding, to the specified job ID is not registered in the process status table T3, the priority processing unit 2402 determines that the received print job is not the print job of the interrupted first printing protocol, and does not preferentially select the received print job.

Figure 25:
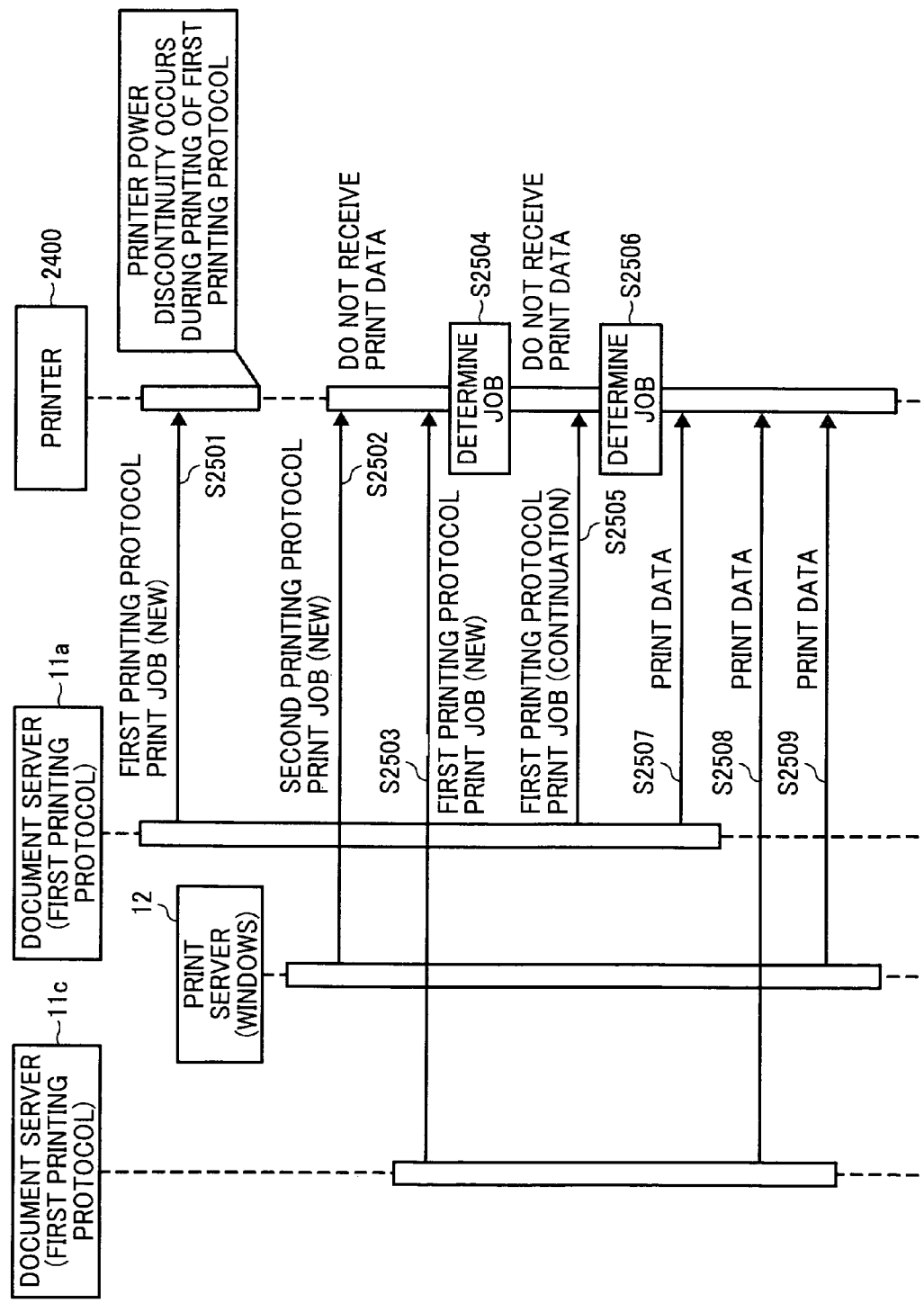
FIG. 25 is a sequence diagram illustrating a flow of a printing process performed by a network printing system according to the third embodiment.
Figure 26:
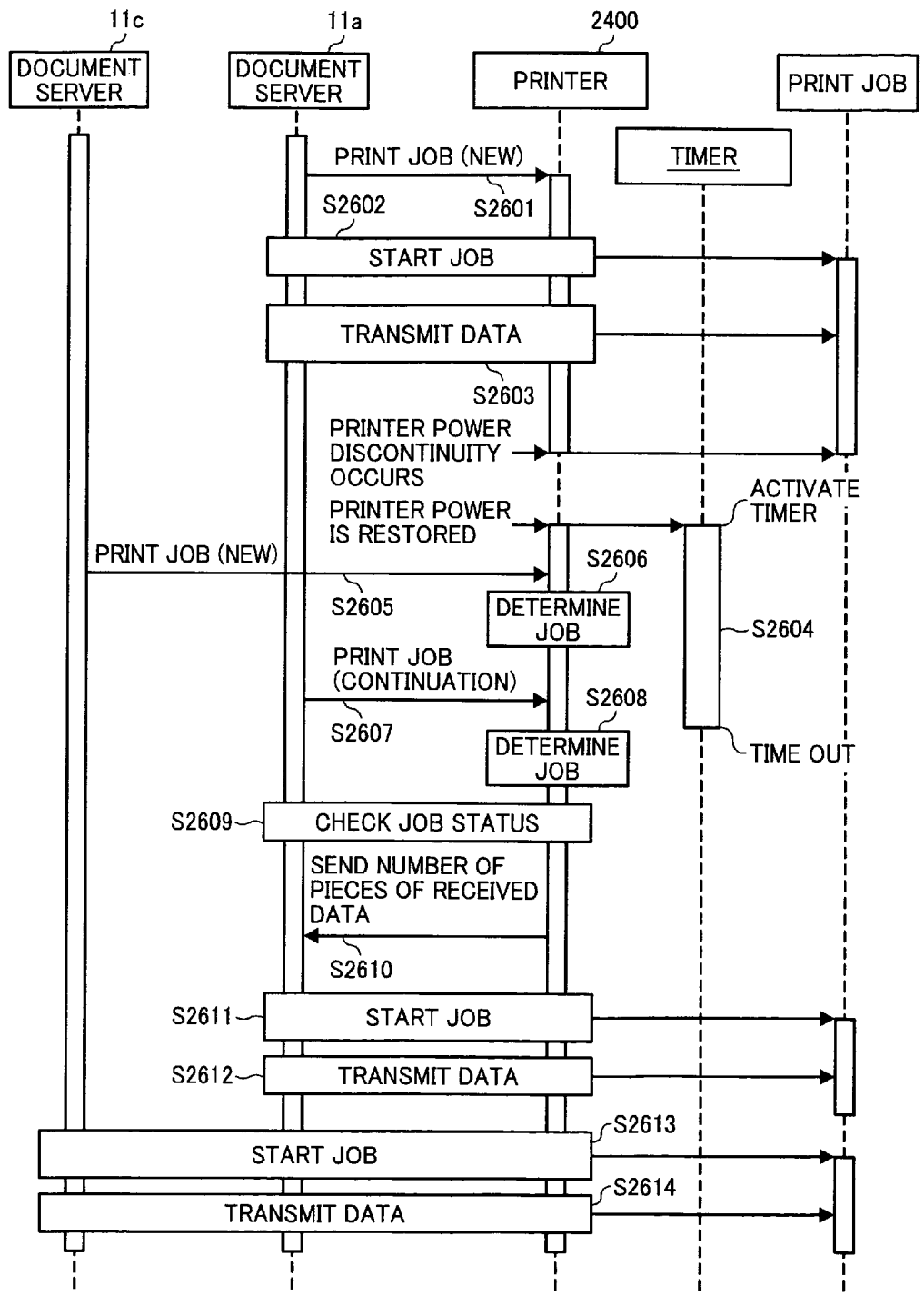
FIG. 26 is a sequence diagram illustrating a detailed flow of the printing process performed by the network printing system according to the third embodiment.
Figure 27:
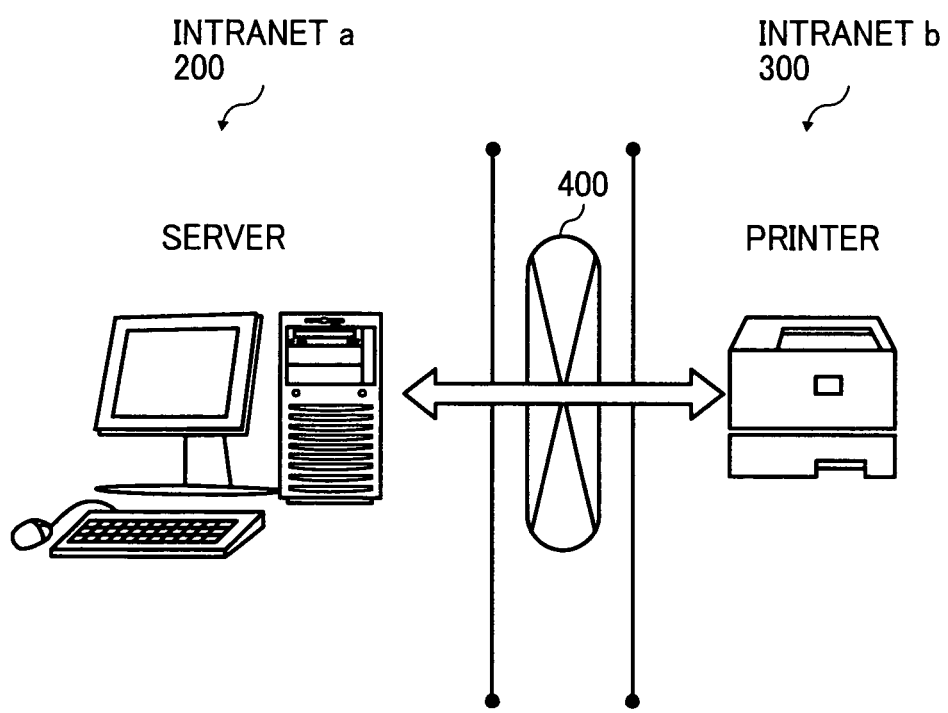
FIG. 27 is a schematic diagram illustrating a system configuration example of a conventional extranet.

Described below is the printing process performed by the network printing system configured as described above according to the embodiment. FIG. 25 is a sequence diagram illustrating a flow of the printing process performed by the network printing system according to the third embodiment. FIG. 26 is a sequence diagram illustrating a detailed flow of the printing process performed by the network printing system according to the third embodiment. FIGS. 25 and 26 illustrate an example in which the printing process is interrupted due to power discontinuity of the printer 2400 and the printing process is resumed by restoring the power of the printer 2400.

A print job of the first printing protocol is transmitted from the document server 11a to the printer 2400 (Steps S2501 and S2601). Then, the print processing unit 103 of the printer 2400 starts execution of the print job (Step S2602), and receives print data from the document server 11a (Step S2603), so that the printing process is performed. At this time, the process-status registering unit 2403 of the printer 2400 registers the number of pieces of received print data in the process status table T3 in association with the job ID every time print data is received from the document server 11a. Furthermore, the process-status registering unit 2403 of the printer 2400 sequentially registers the process statuses such as the number of printed pages in the process status table T3 in association with the job ID in the course of the printing process.

It is assumed here that the power discontinuity occurs in the printer 2400 during the printing process and the printing process is interrupted. Then, when the power of the printer 2400 is restored, the printer 2400 activates the timer 105 (Step S2604). When a print job of the second printing protocol is transmitted by the print server 12 before time out (Step S2502), the priority processing unit 2402 of the printer 2400 receives only a process instruction of the print job of the second printing protocol and does not receive corresponding print data, similarly to the first embodiment.

It is also assumed here that, before the time out, a print job of the first printing protocol is transmitted to the printer 1900 by a document server 11c different from the document server 11a that has transmitted the print job being interrupted (Steps S2503 and S2605). In the transmission of this print job, it is assumed that a job ID of the print job is specified. In this case, the job determining unit 2401 of the printer 2400 determines the job (Steps S2504 and S2606).

More specifically, the job determining unit 2401 determines whether the process status corresponding to the job ID of the print job received from the document server 11c is registered in the process status table T3 or not. In this example, because the process status corresponding to the print job is not registered in the process status table T3, this print job is not preferentially selected. Accordingly, the job registering unit 1903 registers the job ID of the print job and the server ID in the print job table T19 in association with the port number, and does not perform request and reception of print data.

Thereafter, it is assumed that a print job indicating job continuation of the first print protocol is transmitted from the document server 11a to the printer 1900 (Steps S2505 and S2607). In the transmission of the print job, the job ID of the interrupted print job is specified. In this case, the job determining unit 2401 of the printer 2400 determines the job in the same manner as that at Step S2504 (Steps S2506 and S2608).

In this example, because the process status corresponding to the specified job ID is registered in the process status table T3, the print job is preferentially selected. In this case, the printer 2400 checks a job status with the document server 11a (Step S2609), transmits the number of pieces of received print data to the document server 11a (Step S2610) to request the consecutive print data, and receives the print data in response to this request (Step S2507). Then, the print processing unit 103 of the printer 2400 starts execution of the interrupted print job of the first printing protocol (Step S2611). Then, the printer 2400 receives the print data from the document server 11a, so that the printing process is performed (Step S2612).

After the printing process as described above is completed, print data of a new print job of the first printing protocol received from the document server 11c at Step S2503 is received from the document server 11c (Step S2508). Consequently, the printing process of the print job of the first printing protocol received from the document server 11c is started and executed (Steps S2613 and S2614).

After the printing process as described above is completed, the print data of the print job of the second printing protocol received at Step S2502 is received from the print server 12 (Step S2509). Accordingly, the printing process of the print job of the second printing protocol is started.

In the embodiment, an example is explained in which the printing process is interrupted due to the power discontinuity of the printer 2400 and is resumed by restoration of the power of the printer 2400. However, when the printing process is interrupted due to the line disconnection and is resumed by the line reconnection, the job determination is performed in the same manner.

As described above, in the network printing system according to the embodiment, when the printing process is allowed to be resumed and a print job is received from a document server different from the document server that has transmitted the print job being interrupted, priority is given to the continuation of the print job received from the document server that has transmitted the print job being interrupted. Therefore, when a plurality of print jobs of the first printing protocol is received at the time of resuming, the print job related to the interrupted printing process can immediately be resumed, so that the continuity of the printing process of the mission-critical operation system can reliably be ensured.

In the embodiment, whether the received print job of the first printing protocol corresponds to continuation of the interrupted printing process or not is determined based on whether the process status corresponding to the job ID of the received print job is registered in the process status table T3 or not. However, this may be determined based on the server ID contained in the print job.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a communicating unit configured to receive, from a first server apparatus connected to a network, an image forming job being a unit of execution of an image forming process of a first protocol or a second protocol other than the first protocol, the first protocol containing a series of process instructions and print data that allow the image forming process to be performed from an interrupted point when the image forming process is resumed after being interrupted;
   an image-formation processing unit configured to perform the image forming process by executing the image forming job; and
   a priority processing unit configured such that, when an image forming process of an image forming job of the first protocol is interrupted and when receiving both an image forming job of the first protocol related to the interrupted image forming process and an image forming job of the second protocol, the priority processing unit preferentially selects the image forming job of the first protocol related to the interrupted image forming process, the image-formation processing unit being configured to successively perform the interrupted image forming process by executing the preferentially-selected image forming job of the first protocol;
   a job determining unit configured to determine, when receiving a plurality of image forming jobs of the first protocol after the image forming process of the image forming job of the first protocol executed by the image-formation processing unit is interrupted, whether each of the plurality of received image forming jobs is an image forming job of the first protocol related to the interrupted image forming process, the priority processing unit being configured such that when each received image forming job is the image forming job of the first protocol related to the interrupted image forming process, the priority processing unit preferentially selects each received image forming job as an image forming job of the first protocol related to the interrupted image forming process;
   a first storage unit that stores therein a job table containing job identification information for identifying an image forming job and server identification information for identifying a server apparatus that has transmitted the image forming job, in an associated manner; and
   a job registering unit that registers, when receiving an image forming job of the first protocol, the server identification information of a server apparatus that has transmitted the image forming job of the first protocol and the job identification information of the received image forming job of the first protocol in the job table in an associated manner, wherein
   the job determining unit is configured such that after the image forming process of the image forming job of the first protocol executed by the image-formation processing unit is interrupted, when receiving an image forming job of the first protocol in which the job identification information of an image forming job related to the interrupted image forming process is specified, the job determining unit determines whether the server identification information of a server apparatus that has transmitted the received image forming job matches the server identification information that is stored in the job table and corresponding to the specified job identification information to thereby determine whether each of the plurality of received image forming jobs is an image forming job of the first protocol, and
   the priority processing unit is configured such that when the server identification information of the server apparatus that has transmitted the received image forming job matches the server identification corresponding to the specified job identification information, the priority processing unit preferentially selects each received image forming job as an image forming job of the first protocol related to the interrupted image forming process, and when the server identification information of the server apparatus that has transmitted the received image forming job does not match the server identification information corresponding to the specified job identification information, the priority processing unit does not preferentially select the received image forming jobs.

2. The image forming apparatus according to claim 1, wherein
   the priority processing unit is configured such that when an image forming process of an image forming job of the first protocol is interrupted and when receiving both an image forming job of the first protocol related to the interrupted image forming process and an image forming job of the second protocol, the priority processing unit receives a process instruction of the image forming job of the second protocol and does not receive image forming data of the image forming job of the second protocol to thereby preferentially select the image forming job of the first protocol related to the interrupted image forming process.

3. The image forming apparatus according to claim 1, further comprising:
   a timer unit configured to counts time that elapses from when an image forming process of an image forming job of the first protocol is allowed to be resumed after being interrupted, wherein
   the priority processing unit is configured such that when receiving both an image forming job of the first protocol related to the interrupted image forming process and an image forming job of the second protocol within a predetermine time from when the image forming process is allowed to be resumed, the priority processing unit preferentially selects the image forming job of the first protocol related to the interrupted image forming process.

4. The image forming apparatus according to claim 1, wherein
   the priority processing unit is configured to preferentially selects the image forming job of the first protocol of the interrupted image forming process even when the image forming job of the second protocol has already been received and is in a process wait state.

5. The image forming apparatus according to claim 4, wherein
the communicating unit is configured to receives the image forming job of the first protocol even when the image forming job of the second protocol has already been received and is in a process wait state.

6. The image forming apparatus according to claim 1, further comprising:
a second storage unit that stores therein number of pieces of received data being image forming data of an image forming job of the first protocol and being received from the first server apparatus, wherein
the communicating unit is configured such that when resuming the interrupted image forming process of the image forming job of the first protocol, the communicating unit transmits the number of pieces of received data to the first server apparatus and receives from the first server apparatus an image forming job of the first protocol containing image forming data continued from an interrupted point based on the number of pieces of received data, and
the image-formation processing unit is configured to executes the received image forming job of the first protocol to thereby successively perform image formation of the image forming data continued from the interrupted point.

7. The image forming apparatus according to claim 1, further comprising:
a second storage unit that stores therein a process status table containing job identification information for identifying an image forming job and a process status of an image forming process of the image forming job, in an associated manner; and
a process status registering unit configured to registers the process status in the process status table in association with the job identification information of the image forming job of the image forming process according to a progress of the image forming process, wherein
the job determining unit is configured such that when receiving an image forming job of the first protocol in which the job identification information is specified after the image forming process of the image forming job of the first protocol executed by the image-formation processing unit is interrupted, the job determining unit determines whether the process status corresponding to the specified job identification information is registered in the process status table to thereby determine whether each of a plurality of received image forming jobs is an image forming job of the first protocol related to the interrupted image forming process, and
the priority processing unit is configured such that when the process status corresponding to the specified job identification information is registered in the process status table, the priority processing unit preferentially selects each received image forming job as an image forming job of the first protocol related to the interrupted image forming process.

8. The image forming apparatus according to claim 7, wherein
the priority processing unit is configured such that when the process status corresponding to the specified job identification information is not registered in the process status table, the priority processing unit does not preferentially select the received image forming job.

9. The image forming apparatus according to claim 7, wherein the process status registering unit is configured to registers, as the process status, number of printed pages in the process status table in association with the job identification information in a course of the image forming process performed by the image-formation processing unit, and
the job determining unit is configured to determines whether the number of printed pages corresponding to the specified job identification information is registered in the process status table or not to thereby determine whether each of a plurality of received image forming jobs is an image forming job of the first protocol related to the interrupted image forming process.

10. An image forming system comprising:
a first server apparatus; and
an image forming apparatus connected to the first server apparatus via a network,
the image forming apparatus including,
a communicating unit configured to receives, from the first server apparatus, an image forming job being a unit of execution of an image forming process of a first protocol or a second protocol other than the first protocol, the first protocol containing a series of process instructions and print data that allow the image forming process to be performed from an interrupted point when the image forming process is resumed after being interrupted,
an image-formation processing unit configured to performs the image forming process by executing the image forming job,
a priority processing unit configured such that, when an image forming process of an image forming job of the first protocol is interrupted and when receiving both an image forming job of the first protocol related to the interrupted image forming process and an image forming job of the second protocol, the priority processing unit preferentially selects the image forming job of the first protocol related to the interrupted image forming process, the image-formation processing unit being configured to successively performs the interrupted image forming process by executing the preferentially-selected image forming job of the first protocol,
a job determining unit configured to determine, when receiving a plurality of image forming jobs of the first protocol after the image forming process of the image forming job of the first protocol executed by the image-formation processing unit is interrupted, whether each of the plurality of received image forming jobs is an image forming job of the first protocol related to the interrupted image forming process, the priority processing unit being configured such that when each received image forming job is the image forming job of the first protocol related to the interrupted image forming process, the priority processing unit preferentially selects each received image forming job as an image forming job of the first protocol related to the interrupted image forming process,
a first storage unit that stores therein a job table containing job identification information for identifying an image forming job and server identification information for identifying a server apparatus that has transmitted the image forming job, in an associated manner, and
a job registering unit that registers, when receiving an image forming job of the first protocol, the server identification information of a server apparatus that has transmitted the image forming job of the first protocol and the job identification information of the received image forming job of the first protocol in the job table in an associated manner; and the first server apparatus including,
a second communicating unit configured to transmits an image forming job of the first protocol to the image forming apparatus at times of starting up the image forming process and resuming the interrupted image forming process, wherein the job determining unit is configured such that after the image forming process of the image forming job of the first protocol executed by the image-formation processing unit is interrupted, when receiving an image forming job of the first protocol in which the job identification information of an image forming job related to the interrupted image forming process is specified, the job determining unit determines whether the server identification information of a server apparatus that has transmitted the received image forming job matches the server identification information that is stored in the job table and corresponding to the specified job identification information to thereby determine whether each of the plurality of received image forming jobs is an image forming job of the first protocol, and the priority processing unit is configured such that when the server identification information of the server apparatus that has transmitted the received image forming job matches the server identification corresponding to the specified job identification information, the priority processing unit preferentially selects each received image forming job as an image forming job of the first protocol related to the interrupted image forming process, and when the server identification information of the server apparatus that has transmitted the received image forming job does not match the server identification information corresponding to the specified job identification information, the priority processing unit does not preferentially select the received image forming jobs.

11. The image forming system according to claim 10, wherein
the first server apparatus further includes:
a data-amount calculating unit that receives number of pieces of image forming data being image forming data received by an image forming process of the first protocol before the image forming process is interrupted, and calculates an amount of pieces of consecutive image forming data for continuing image formation based on the received number of pieces of image forming data, wherein
the second communicating unit transmits an image forming job of the first protocol, the image forming job containing image forming data with which image formation is performed after the image forming process is resumed, based on the calculated amount of pieces of image forming data.

12. An image forming method implemented by an image forming apparatus, the image forming method comprising:
receiving, from a server apparatus connected to a network, an image forming job being a unit of execution of an image forming process of a first protocol or a second protocol other than the first protocol, the first protocol containing a series of process instructions and print data that allow the image forming process to be performed from an interrupted point when the image forming process is resumed after being interrupted;
performing the image forming process by executing the image forming job; and
preferentially selecting, when an image forming process of an image forming job of the first protocol is interrupted and an image forming job of the first protocol related to the interrupted image forming process and an image forming job of the second protocol are received, the image forming job of the first protocol related to the interrupted image forming process, the performing including successively performing the interrupted image forming process by executing the preferentially-selected image forming job of the first protocol;
determining, when receiving a plurality of image forming jobs of the first protocol after the image forming process of the image forming job of the first protocol executed by the image-formation processing unit is interrupted, whether each of the plurality of received image forming jobs is an image forming job of the first protocol related to the interrupted image forming process, each received image forming job being preferentially selected as an image forming job of the first protocol related to the interrupted image forming process when each received image forming job is the image forming job of the first protocol related to the interrupted image forming process;
storing a job table containing job identification information for identifying an image forming job and server identification information for identifying a server apparatus that has transmitted the image forming job, in an associated manner;
registering, when receiving an image forming job of the first protocol, the server identification information of a server apparatus that has transmitted the image forming job of the first protocol and the job identification information of the received image forming job of the first protocol in the job table in an associated manner;
determining whether the server identification information of a server apparatus that has transmitted the received image forming job matches the server identification information that is stored in the job table and corresponding to the specified job identification information to thereby determine whether each of the plurality of received image forming jobs is an image forming job of the first protocol, after the image forming process of the image forming job of the first protocol executed by the image-formation processing unit is interrupted, when receiving an image forming job of the first protocol in which the job identification information of an image forming job related to the interrupted image forming process is specified;
preferentially selecting each received image forming job as an image forming job of the first protocol related to the interrupted image forming process when the server identification information of the server apparatus that has transmitted the received image forming job matches the server identification corresponding to the specified job identification information, and not when the server identification information of the server apparatus that has transmitted the received image forming job does not match the server identification information corresponding to the specified job identification information.

* * * * *